United States Patent
Kimata

[11] Patent Number: 5,998,778
[45] Date of Patent: Dec. 7, 1999

[54] FOCAL PLANE ARRAY AND DRIVING METHOD THEREFOR

[75] Inventor: Masafumi Kimata, Tokyo, Japan

[73] Assignee: Mitsubishi Denki Kabushiki Kaisha, Tokyo, Japan

[21] Appl. No.: 08/934,081

[22] Filed: Sep. 19, 1997

[30] Foreign Application Priority Data

Dec. 24, 1996 [JP] Japan .................................. 8-343167

[51] Int. Cl.⁶ .................................................. H04N 3/14
[52] U.S. Cl. ........................ 250/208.1; 348/304; 348/307
[58] Field of Search ........................ 250/208.1; 348/302, 348/303, 304, 306, 307, 308, 317

[56] References Cited

U.S. PATENT DOCUMENTS

| | | |
|---|---|---|
| 4,577,233 | 3/1986 | Kimata . |
| 4,581,539 | 4/1986 | Kimata . |
| 5,717,199 | 2/1998 | Carbone et al. ...................... 250/208.1 |
| 5,789,736 | 8/1998 | Kawahara ............................. 250/208.1 |

OTHER PUBLICATIONS

H. Yagi, et al. "Monolithic Schottky–Barrier Infrared Image Sensor with 71% Fill Factor", Optical Engineering, vol. 33, No. 5, May 1994, pp. 1454–1460.

M. Kimata, et al. "A 512×512–Element PtSi Schottky–Barrier Infrared Image Sensor", IEEE Journal of Solid–State Circuits, vol. SC–22, No. 6, Dec. 1987, pp. 1124–1129.

Primary Examiner—Edward P. Westin
Assistant Examiner—Kevin Pyo
Attorney, Agent, or Firm—Oblon, Spivak, McClelland, Maier & Neustadt, P.C.

[57] ABSTRACT

A focal plane array comprising two-dimensionally arranged photodetectors, charge transfer devices, transfer gates and a pixel row selection circuit, the focal plane array being operated in such a manner that the signal charges are read out from the photodetectors to vertical charge transfer device in one horizontal retrace period and the signal charges stored in the vertical charge transfer device are transferred to outside of a photodetector array region, wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected.

8 Claims, 16 Drawing Sheets

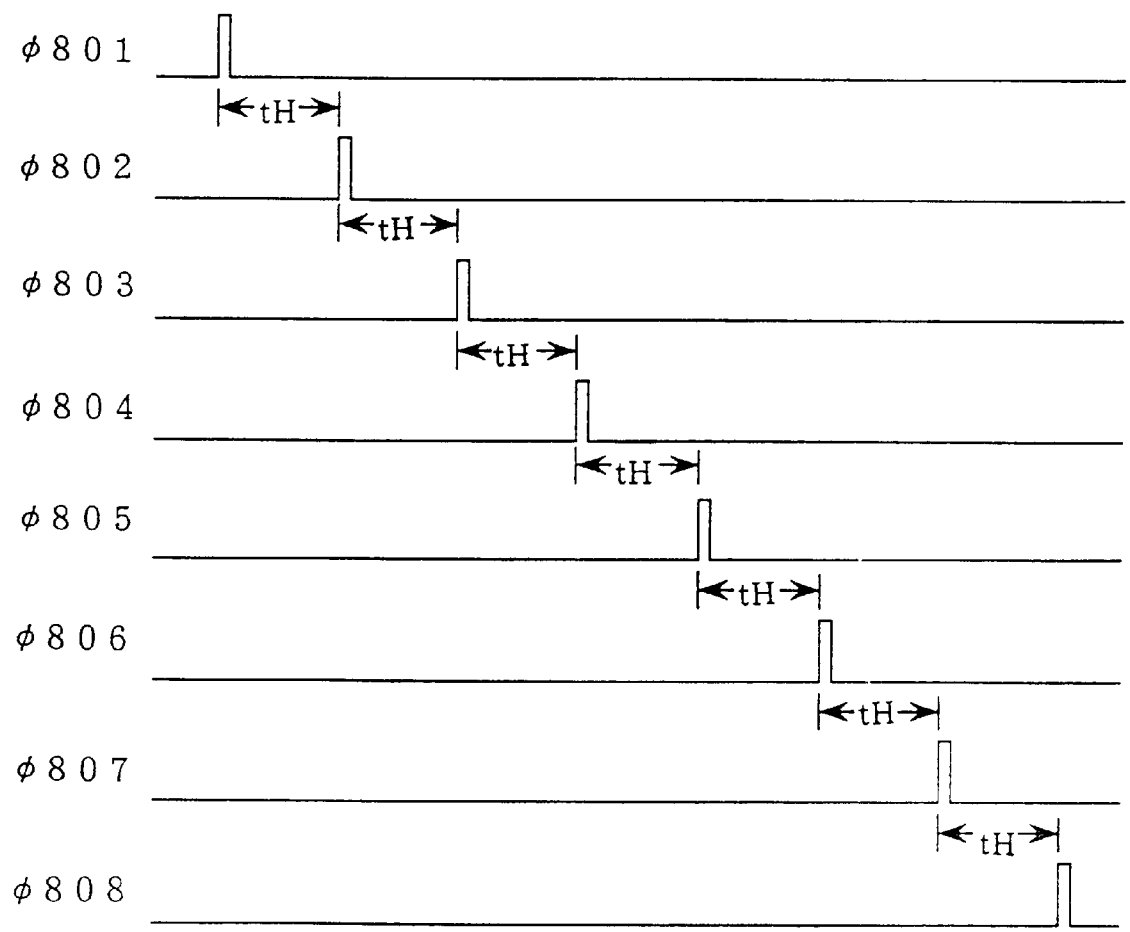

PRIOR ART FIG. 14(a)
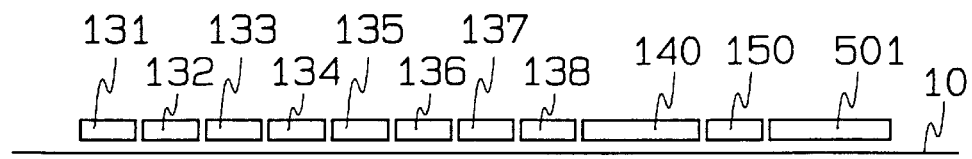
PRIOR ART FIG. 14(b)
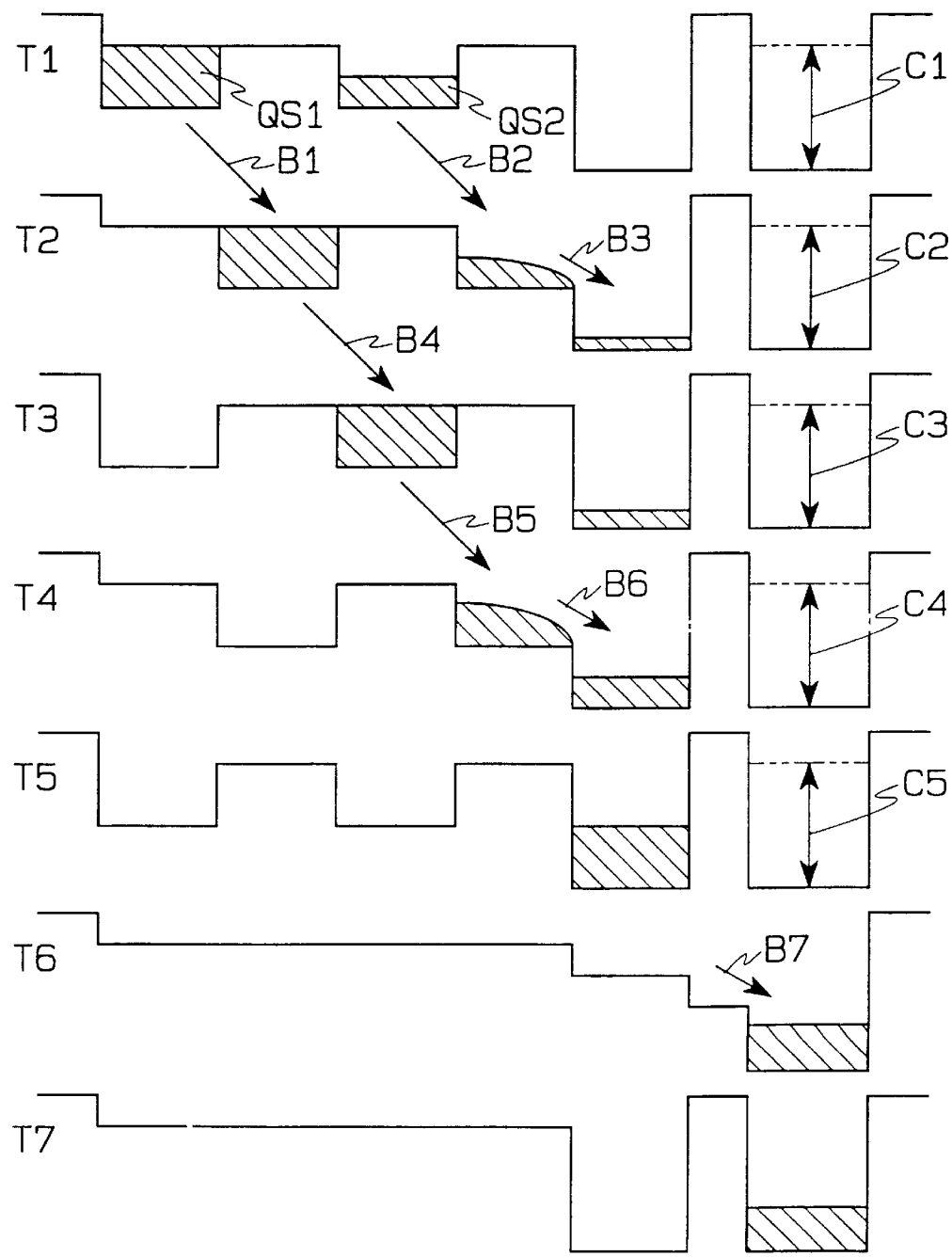

5,998,778

FOCAL PLANE ARRAY AND DRIVING METHOD THEREFOR

BACKGROUND OF THE INVENTION

The present invention relates to a two-dimensional focal plane array and a driving method therefor.

A conventional focal plane array is explained referring to the drawings. FIG. 10 is a block diagram showing the structure of. A conventional image sensor of CSD (charge sweep device) system shown in IEEE Journal of Solid State Circuits, Vol. SC-22, p.1124 to 1129 (hereinafter referred to as "report 1"), which is an example of a conventional focal plane array. In FIG. 10, numerals 111 to 118, 211 to 218 and 311 to 318 denote photodetectors; numerals 121 to 128, 221 to 228 and 321 to 328 denote the transfer gates for controlling the transfer of signal charges stored or accumulated in the photodetectors 111 to 118, 221 to 218 and 311 to 318 to vertical charge transfer devices 130, 230 and 330; numerals 140, 240 and 340 denote the storage gates for storing temporarily the signal charges transferred through the vertical charge transfer devices 130, 230 and 330; numerals 150, 250 and 350 denote the storage control gates for controlling the transfer of the signal charges stored on the storage gates 140, 240, and 340 to horizontal charge transfer devices 500; numeral 600 denotes a preamplifier for generating the voltage signal according to the signal charge amount outputted from the horizontal charge transfer device 500; numeral 700 shows an output section of the image sensor; numeral 800 shows a pixel row selection circuit; and numeral 900 shows a drive circuit for the vertical charge transfer devices 130, 230 and 330. The photodetector comprises a photodiode or a Schottky barrier diode; the transfer gate comprises MOS transistors; the vertical charge transfer device comprises CSD; the storage gate comprises MOS capacitors; and the horizontal charge transfer device comprises a CCD (charge coupled device); and storage control gate comprises MOS transistors (a source electrode and a drain electrode are constituted respectively of storage gates and horizontal charge transfer devices).

FIG. 11 is a block diagram showing a pixel row selection circuit and a transfer gate of the image sensor shown in FIG. 10. The pixel row selection circuit 800 comprises shift registers. Numerals 801 to 808 denote each stage of the pixel row selection circuits. Each stage of the pixel row selection circuit 800 is connected respectively to three transfer gates provided along the horizontal direction. For example, the first stage 801 of the pixel row selection circuit is connected to the transfer gates 121, 221 and 321, and the second stage 802 of the pixel row selection circuit is connected to the transfer gates 122, 222 and 322.

FIG. 12 is a block diagram showing the drive circuit for the image sensor and the vertical charge transfer device as shown in FIG. 10. Each of the vertical charge transfer devices 130, 230 and 330 comprises CSD. In FIG. 12, numerals 131 to 138 denote the respective gate electrodes (hereinafter, to be simply referred to as "vertical gate electrode") in the vertical charge transfer device 130; the numerals 231 to 238 denote the respective gate electrodes (hereinafter, to be simply referred to as "vertical gate electrode") of the vertical charge transfer device 230; numerals 331 to 338 denote the gate electrodes of the vertical charge transfer device 330. Further, the drive circuit 900 comprises a MOS switch circuit or a shift register circuit. The numerals 901 to 908 denote the respective gate electrodes (hereinafter, to be simply referred to as "drive gate electrode") of the drive circuits. Each of the drive gate electrodes 901 to 908 is connected to the three vertical gate electrodes provided along the horizontal direction For example, the drive gate electrode 901 is connected to the vertical gate electrodes 131, 231 and 331, and the drive gate electrode 902 is connected to the vertical electrodes 132, 232 and 332. Accordingly, the respective drive gate electrodes give clock signals respectively to three vertical gate electrodes provided along the horizontal direction. In the conventional image sensor described above, for simple explanation, there are shown 3 photodetectors in the horizontal direction and 8 in the vertical direction, respectively, but normally in practice there are several hundreds of the photodetectors provided both in horizontal and vertical directions. As the number of the photodetectors is equal to the number of pixels in the image sensor, the conventional image sensors have in practice several hundred pixels in horizontal and vertical directions, respectively.

Referring to FIGS. 10 to 12, the transfer gates 121 to 128, 221 to 228, and 321 to 328 and the vertical gate electrodes 131 to 138, 231 to 238, and 331 to 338 are shown as discrete structures not to be integrated with each other. However, as shown in the foregoing report 1, the vertical gate electrode and the gate electrode of the transfer gate adjacent to vertical gate electrode (hereinafter to be referred to simply as "trans gate electrode") may be formed in a single gate electrode. By controlling independently the impurity concentrations in the lower channels in the vertical gate electrode and the trans gate electrode, the transfer gate and the vertical charge transfer device can be operated independently.

The operation of the image sensor is explained by referring to FIG. 13. FIG. 13 is a timing chart showing the clock signal to be outputted by the pixel row selection circuit in the conventional image sensor as shown in FIG. 10. In FIG. 13, symbols $\phi 801$ to $\phi 808$ show the outputs of the respective stages in the pixel row selection circuit. The period from a time when the output of the n-th stage of the pixel row selection circuit reaches the high (H) level to another time when the output of the (n+1)-th stage of the pixel row selection circuit reaches the high (H) level (hereinafter referred to as "H level") is one horizontal period, i.e., the time while the image sensor scans one horizontal line (in the drawing, shown by "tH"). The transfer gate transfers the signal charge in the photodetector to the vertical charge transfer device when a clock signal is generated in the stage of the pixel row selection circuit to which the transfer gate is connected. Accordingly, by generating a clock signal in any stage in the pixel row selection circuit in every horizontal period, the image sensor can be operated so that the signal charge in one horizontal line is transferred to the vertical charge transfer device in every horizontal period. The above horizontal line comprises a plurality of optical detectors adjacent to each other in the horizontal direction among the two-dimensionally arrayed optical detectors. In FIG. 10, for example, the optical detectors 111, 211 and 311 are the plural optical detectors adjacent to each other in the horizontal direction.

Referring to FIGS. 14 and 15, a detailed description is given on the signal charges which are to be transferred to the horizontal gate electrode.

FIGS. 14 (a) and 14(b) are illustrations showing the structure on the section of A—A line in FIG. 10 and the potential on the section of A—A line. FIG. 14(a) is an illustration of the sections of the vertical gate electrodes 131 to 138, storage gate 140, storage control gate 150, gate electrode 501 to which the above storage control gate 150 is connected from the horizontal charge transfer device 500 (hereinafter to be referred to as "horizontal gate electrode"), and a substrate 10 on which the constitution elements of the image sensor are to be formed (not illustrated in FIG. 10). Further, though not illustrated, there are insulating films provided between the vertical gate electrodes 131 to 138, storage gate 140 and storage control gate 150, and horizontal gate electrode 501 and the substrate 10. FIG. 14(*b*) is an illustration showing the potential in the lower part of the vertical gate electrodes 131 to 138, storage gate 140, storage control gate 150 and horizontal gate electrode 501 shown in FIG. 14(*a*). To the vertical gate electrodes 131 to 138, the signals φ901 to φ908 from the drive gate electrode are inputted, respectively. In FIGS. 14(*a*) and 14(*b*) there is shown a condition after applying a clock signal to the transfer gate from the pixel row selection circuit and transferring (reading out) the signal charge to the vertical charge transfer device from the photodetector. In FIG. 14, the parts shown by QS1 and QS2 are the signal charges from one photodetector. As shown in FIGS. 14(*a*) and 14(*b*), the signal charges QS1 and QS2 are transferred to the lower part of the horizontal gate electrode 501 in the interval between the timings T1 to T7.

FIG. 15 is a timing chart showing an output of the drive gate electrode which is connected to the vertical gate electrode shown in FIG. 14(*a*). In FIGS. 14(*a*) to 14(*b*) and 15, timings T1 to T5 show the horizontal scanning periods, and timings T6 and T7 show the horizontal retrace periods. The horizontal period comprises one horizontal retrace period and one horizontal scanning period. In FIG. 15, symbols φ901 to φ908 show the electrical signals to be applied respectively to the vertical gate electrodes 131 to 138 from the drive gate electrode, and symbols φST and φSC show the electrical signals to be applied respectively to the storage gate 140 and the storage control gate 150 shown in FIG. 14(*a*). Though not illustrated, an electrical signal to be applied to the horizontal gate electrode 501 is shown by φH.

First, in the timing T1, because the signals φ901 and φ902 show H levels, the signal charge QS1 is stored on the lower parts of the vertical gate electrodes 131 and 132. In the timings T1 to T2, the signal φ901 changes to a low (L) level (hereinafter referred to as "L level"), and the signal φ902 changes to L level after the signal φ901. Simultaneously, at the time when the signal φ901 changes to L level, the signal φ903 changes to H level; at the time when the signal φ902 changes to L level, the signal φ904 changes to H level. Accordingly, in the timing T2, the signal charge QS1 is stored on the lower part of the vertical gate electrodes 133 and 134. In FIG. 14(*b*), the state of the signal charge QS1 shifting from the lower part of the vertical gate electrodes 131 and 132 to the lower part of the vertical gate electrodes 133 and 134 is shown by an arrow B1.

In the timings T2 to T3, the signal φ903 changes to L level, and the signal φ904 changes to L level after the signal φ903. Simultaneously, at the time when the signal φ903 changes to L level, the signal φ905 changes to H level; at the time when the signal φ904 changes to L level, the signal φ906 changes to H level. Accordingly, in the timing T3, the signal charge QS1 is stored in the lower part of the vertical gate electrodes 135 and 136. In FIG. 14(*b*), the state of the signal charge QS1 shifting from the lower part of the vertical gate electrodes 133 and 134 to the lower part of the vertical gate electrodes 135 and 136 is shown by an arrow B4.

In the timings T3 to T4, the signal φ905 changes to L level, and the signal φ906 changes to L level after the signal φ905. Simultaneously, at the time when the signal φ905 changes to L level, the signal φ907 changes to H level; at the time when the signal φ906 changes to L level, the signal φ908 changes to H level. Also, in the timings T3 to T4, the signal φST always indicates H level, and the signal φSC always indicates L level. Accordingly, in the timing T4, the signal charge QS1 is stored in the lower part of the vertical gate electrodes 137 and 138 and the storage gate 140. In FIG. 14(*b*), the state of the signal charge QS1 shifting from the lower part of the vertical gate electrodes 135 and 136 to the lower part of the vertical gate electrodes 137 and 138 and the storage gate 140 is shown by an arrow B5 and an arrow B6.

In the timings T4 to T5, the signal φ907 changes to L level, and the signal φ908 changes to L level after the signal φ907. Also, in the timings T4 to T5, the signal φST always indicates H level, and the signal φSC always indicates L level. Accordingly, in the timing T5, the signal charge QS1 is stored on the lower part of the storage gate 140.

On the other hand, in the timing T1, because the signals φ905 and φ906 indicate H level, the signal charge QS2 is stored in the lower parts of the vertical gate electrodes 135 and 136. Between the timing T1 and the timing T2, the signal φ905 changes to L level, and the signal φ906 changes to L level later than the signal φ905. Simultaneously, at the time when the signal φ905 changes to L level, the signal φ907 changes to H level, and at the time when the signal φ906 changes to L level, the signal φ908 changes to H level. Also, in the timings T1 to T2, the signal φST always indicates H level, and the signal φSC always indicates L level. Accordingly, in the timing T2, the signal charge QS2 is stored in the lower part of the vertical gate electrodes 137 and 138 and the storage gate 140. In FIG. 14(*b*), the state of the signal charge QS2 shifting from the lower part of the vertical gate electrodes 135 and 136 to the lower part of the vertical gate electrodes 137 and 138 and the storage gate 140 is shown by an arrow B2 and an arrow B3.

In the timings T2 to T3, the signal φ907 changes to L level, and the signal φ908 changes to L level after the signal φ907. Also, in the timings T2 to T3, the signal φST always indicates H level, and the signal φSC always indicates L level. Accordingly, in the timing T3, the signal charge QS2 is stored on the lower part of the storage gate 140.

As shown in FIG. 14, in the timing T5, the signal charges QS1, QS2 are stored in the lower part of the storage gate 140. In the timings T5 to T7, when the signals φSC and φH change to H levels, and the signal φST changes to L level after the signals φSC and φH change to H levels, the signal charges QS1 and QS2 are stored on the lower part of the horizontal gate electrode 501.

In the timings T1 to T7, the signal charges QS1, QS2 stored in the lower part of the storage gate 140 in the horizontal scanning period comprising the timings T1 to T5 are outputted from the image sensor through the horizontal charge transfer device 500 and preamplifier 600 in the next horizontal period after the previous horizontal period which includes the timings T1 to T7 shown in FIG. 14. In the horizontal scanning period including the timings T1 to T5, the signal charges are stored in the lower part of the storage gates 240, 340 (ref. FIG. 10), respectively, in the same manner as in the signal charge QS1 and QS2. The signal charges stored in the lower part of the storage gates 140, 240 and 340 are sequentially outputted from the image sensor through the horizontal charge transfer device 500 and the preamplifier 600.

In the timings T1 to T5, the potential on the lower part of the horizontal gate electrode 501 may be between H level and L level shown by symbols C1 to C5.

There is given a detailed explanation on the operation of the pixel row selection circuit 800 shown in FIG. 10. FIG.

16 is a timing chart showing the clock signals to be outputted from the pixel row selection circuit shown in FIG. 10. The pixel row selection circuit can be constituted in general by a shift register for operating by inputting the electrical signals φT1 and φT2 as a two-phase clock signal. φTS shows an electrical signal which includes a starting clock signal to determine the start of operation of the pixel row selection circuit. The outputs φ801 to φ808 of the pixel row selection circuit are synchronized with the signal φT1, which is outputted one by one in the order of the outputs φ801 to φ808 on each horizontal period tH according to the start clock signal of the signal φTS.

It is also possible to design the pixel row selection circuit so as to operate the pixel row selection by using an interlace scanning system which is a standard television scanning system, for example, RS170. Also, there is disclosed in Japanese Unexamined Patent Publication No. 292405/1993 a system which changes over the interlace operation system externally only by an electrical signal, wherein there is disclosed a technique which permits the selection of the optimum interlace system according to the condition by using the focal plane array. In such a method, changeover can be made between the field storage system for reading out the signal charge of the photodetector of all pixels arranged in the focal plane array in each field, and the frame storage system for reading out only once in one frame the signal charge of the photodetector of each pixel.

According to the conventional CSD system, that is, focal plane array as stated above, changeover can be performed between the field storage system and the frame storage system. However, the circuits necessary for realizing the above-mentioned change are complicated, and the number of the electric signals to be inputted to the focal plane array also increases. Additionally, there are such problems as not to be possible to apply optional interlace or multifarious scanning methods such as scanning a part of the pixels.

Though it is possible to design a pixel row selection circuit so as to permit random access, such system involves problems that while the diversified uses are increased beyond necessity, the clock signal inputs from external source increase to make the control complicated.

The present invention solves the above-mentioned problem and provides, a CSD system focal plane array having a simple structure in which a pixel row selection circuit is mounted wherein simple and multifarious scanning can be made by only inputting a small number of clock signals.

SUMMARY OF THE INVENTION

In order to solve the problem, a focal plane array according to the present invention is a focal plane array comprising two-dimensionally arranged photodetectors, charge transfer devices for reading out signal charges stored in the photodetectors sequentially, transfer gates each connected between each photodetector and charge transfer device and a pixel row selection circuit connected to transfer gates; wherein the focal plane array is operated in such a manner that the signal charges are read out from the photodetectors included in at least one horizontal line to a vertical charge transfer device in one horizontal retrace period and in one horizontal period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected.

Preferably, the switching transistor is one selected from a MOS transistor and a bipolar transistor.

Preferably, the switching transistor is a MOS transistor.

A first driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one horizontal period including at least one horizontal retrace period the signal charges stored in the vertical charge transfer devices are transferred to outside of a photodetector array region in which the photodetectors are two-dimensionally arranged; wherein the pixel row selection circuit comprises a shift register and a switching transistor connected between the shift register and the transfer gates; and wherein the horizontal line is selected by combination of driving the shift resister and driving the switching transistor so that a photodetector from which signal charge is to be read out is selected, the driving method comprising:

(1) a first field of driving the shift resister so that an output of a first stage of the shift resister rises to selection level in a second horizontal retrace period counted from a time when a starting clock signal is inputted into the shift resister; and so that outputs of remaining stages of the shift resister rise to selection level sequentially by two consecutive stages in one horizontal retrace period in each horizontal retrace period after the second horizontal retrace period, and (2) a second field of driving the shift resister so that an output of each stage of the shift resister rises to selection level sequentially by two consecutive stages in one horizontal retrace period after the second horizontal retrace period, and further providing a control signal to the switching transistor so that the switching transistor changes to ON state when an output of at least one stage of the shift resister rises to selection level, wherein one frame comprises the first field and the second field.

A second driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one horizontal period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates;

and by combination of driving the shift resister and driving the switching transistor the horizontal line is selected so that a photodetector from which signal charge is to be read out is selected, the driving method comprising:

(1) a first field of driving the shift resister so that an output of a first stage of the shift resister rises to selection level in a second horizontal retrace period counted from a time when a starting clock signal is inputted into the shift resister; and so that outputs of remaining stages of the shift resister rise to selection level sequentially by two consecutive stages in one horizontal retrace period in each horizontal retrace period after the second horizontal retrace period, and providing a control signal to the switching transistor so that the switching transistor changes to ON state when an output of at least an N-th stage of the shift resister rises to selection level, where N is an odd number and (2) a second field of driving the shift resister so that an output of each stage of the shift resister rises to selection level sequentially by two consecutive stages in one horizontal retrace period after the second horizontal retrace period counted from a time when a starting clock signal is inputted into the shift register, and providing a control signal to the switching transistor so that the switching transistor changes to ON state when an output of at least an M-th stage of the shift resister rises to selection level, where M is even number, wherein one frame comprises the first field and the second field.

A third driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one vertical period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected, the driving method comprising (1) a first field of driving the shift reigstor so that an output of a first stage of the shift resister rises to selection level in a second horizontal retrace period counted from a time when a starting clock signal is inputted into the shift resister; and so that outputs of remaining stages of the shift resister rise to selection level sequentially by n consecutive stages in each horizontal retrace period in each horizontal retrace period after the second horizontal retrace period, and (2) a second, . . . , an i-th, . . . , an n-th fields of driving the shift resister so that outputs of the first stage to the i-th field of the shift resister rise to selection level in a second horizontal retrace period counted from a time when a starting clock signal is inputted into the shift resister; and so that an output of each stage of the shift resister rise to selection level sequentially by n stages in each horizontal retrace period after the second horizontal retrace period, and further providing a control signal to the switching transistor so that the switching transistor changes to ON state when an output of at least one stage of the shift resister rises to selection level, where $2 \leq i \leq n$ and $n \leq a$ predetermined integer, wherein one frame comprises n fields.

A fourth driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one vertical period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected, the driving method comprising (1) a first field of driving the shift resister so that an output of a first stage of the shift resister rises to selection level in a second horizontal retrace period counted from a time when a starting clock signal is inputted into the shift resister; and so that outputs of remaining stages of the shift resister rise to selection level sequentially by n consecutive stages in each horizontal retrace period in each horizontal retrace period after the second horizontal retrace period, and providing a control signal to the switching transistor so that the switching transistor changes to ON state when outputs of a first, an (n+1)-th, a (2n+1)-th order states of the shift resister rise to selection level, and (2) a second, . . . , an i-th, . . . , an n-th fields of driving the shift resister so that outputs of the first stage to the i-th field of the shift resister rise to selection level in a second horizontal retrace period counted from a time when a starting clock signal is inputted into the shift resister; and so that an output of each stage of the shift resister rise to selection level sequentially by n stages in each horizontal retrace period after the second horizontal retrace period, and further providing a control signal to the switching transistor so that the switching transistor changes to ON state when outputs of at least an i-th, an (n+i)-th and a (2n+i)-th stages of said shift resister rise to selection level, where $2 \leq i \leq n$ and $n \leq a$ predetermined integer, wherein one frame comprises n fields.

A fifth driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one vertical period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected, wherein a control signal is provided so that the switching transistor changes to ON state at least when an output of shift register corresponding to a desired horizontal line rises to selection level.

Preferably, in a sixth driving method according to the present invention, the focal plane array includes a plurality of desired horizontal lines, each of which is vertically consecutive.

Preferably, in a seventh driving method according to the present invention, the desired horizontal lines are sets of plural horizontal lines comprising vertically consecutive plural horizontal lines and the sets are located separately to each other.

Preferably, in an eighth driving method according to the present invention, as for a speed of scanning each stage of the shift register, a speed for scanning horizontal lines except for the desired horizontal line is faster than one for scanning the desired horizontal line.

Preferably, in a ninth driving method according to the present invention, scanning for a stage of a shift register concerning plural horizontal lines adjacent to each other is performed in one horizontal retrace period.

A tenth driving method according to the present invention is a driving method of the focal plane array, comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one vertical period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected; wherein at least two driving methods selected from the following methods of (a) to (g) are alternately performed;

(a) a first driving method comprising (1) a first field of driving the shift resister so that an output of a first stage of the shift resister rises to selection level in a second horizontal retrace period counted from a time when a starting clock signal is inputted into the shift resister; and so that outputs of remaining stages of the shift resister rise to selection level sequentially by two consecutive stages in one horizontal retrace period in each horizontal retrace period after the second horizontal retrace period, (2) a second field of driving the shift resister so that an output of each stage of the shift resister rises to selection level sequentially by two consecutive stages in one horizontal retrace period after the second horizontal retrace period, and further providing a control signal to the switching transistor so that the switching transistor changes to ON state when an output of at least one stage of the shift resister rises to selection level, wherein one frame comprises the first field and the second field;

(b) a second driving method comprising (1) a first field of driving the shift resister so that an output of a first stage of the shift resister rises to selection level in a second horizontal retrace period counted from a time when a starting clock signal is inputted into the shift resister; and so that outputs of remaining stages of the shift resister rise to selection level sequentially by two consecutive stages in one horizontal retrace period in each horizontal retrace period after the second horizontal retrace period, and providing a control signal to the switching transistor so that the switching transistor changes to ON state when an output of at least odd number order stage of the shift resister rises to selection level, and (2) a second field of driving the shift resister so that an output of each stage of the shift resister rises to selection level sequentially by two consecutive stages in one horizontal retrace period after the second horizontal retrace period, and providing a control signal to the switching transistor so that the switching transistor changes to ON state when an output of at least even number order stage of the shift resister rises to selection level, wherein one frame comprises the first field and the second field;

(c) a third driving method comprising (1) a first field of driving the shift resistor so that an output of the first stage of the shift resister rises to selection level in the second horizontal retrace period counted from a time when a starting clock signal is inputted into the shift resister; and so that outputs of remaining stages of the shift resister rise to selection level sequentially by n consecutive stages in each horizontal retrace period in each horizontal retrace period after the second horizontal retrace period, (2) a second, . . . , an i-th, . . . , an n-th fields of driving the shift resister so that outputs of the first stage to the i-th field of the shift resister rise to selection level in a second horizontal retrace period counted from a time when a starting clock signal is inputted into the shift resister; and so that an output of each stage of the shift resister rise to selection level sequentially by n stages in each horizontal retrace period after the second horizontal retrace period, and further providing a control signal to the switching transistor so that the switching transistor changes to ON state when an output of at least one stage of the shift resister rises to selection level, wherein one frame comprises n fields;

(d) a fourth driving method comprising (1) a first field of driving the shift resister so that an output of the first stage of the shift resister rises to selection level in a second horizontal retrace period counted from a time when a starting clock signal is inputted into the shift resister; and so that outputs of remaining stages of the shift resister rise to selection level sequentially by n consecutive stages in each horizontal retrace period in each horizontal retrace period after the second horizontal retrace period, and providing a control signal to the switching transistor so that the switching transistor changes to ON state when outputs of a first, an (n+1)-th, a (2n+1)-th order states of the shift resister rise to selection level, and (2) a second, ..., an i-th, ..., an n-th fields of driving the shift resister so that outputs of the first stage to the i-th field of the shift resister rise to selection level in a second horizontal retrace period counted from a time when a starting clock signal is inputted into the shift resister; and so that an output of each stage of the shift resister rise to selection level sequentially by n stages in each horizontal retrace period after the second horizontal retrace period, and further providing a control signal to the switching transistor so that the switching transistor changes to ON state when outputs of at least an i-th, an (n+i)-th and a (2n+i)-th stages of the shift resister rise to selection level, wherein one frame comprises n fields;

(e) a fifth driving method wherein a control signal is provided so that the switching transistor changes to ON state at least when an output of shift register corresponding to a desired horizontal line rises to selection level.

(f) a sixth driving method wherein the focal plane array includes a plurality of desired horizontal lines, each of which is vertically consecutive.

(g) a seventh driving method, wherein the desired horizontal lines are sets of plural horizontal lines comprising vertically consecutive plural horizontal lines and the sets are located separately.

(h) an eighth driving method wherein as for a speed of scanning each stage of the shift register, a speed for scanning horizontal lines except for the desired horizontal line is faster than one for scanning the desired horizontal line.

(i) a ninth driving method wherein scanning for a stage of a shift register concerning plural horizontal lines adjacent to each other is performed in one horizontal retrace period.

An eleventh driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one horizontal period including at least one horizontal retrace period the signal charges stored in the vertical charge transfer devices are transferred to outside of a photodetector array region in which the photodetectors are two-dimensionally arranged; wherein the pixel row selection circuit comprises a shift register and a switching transistor connected between the shift register and the transfer gates; and wherein the horizontal line is selected by combination of driving the shift resister and driving the switching transistor so that a photodetector from which signal charge is to be read out is selected, the driving method comprising:

(1) a first field of driving the shift resister so that an output of a first stage of the shift resister rises to selection level in a predetermined horizontal retrace period after a time when a starting clock signal is inputted into the shift resister; and so that outputs of remaining stages of the shift resister rise to selection level sequentially by two consecutive stages in one horizontal retrace period in each horizontal retrace period after the predetermined horizontal retrace period, and (2) a second field of driving the shift resister so that an output of each stage of the shift resister rises to selection level sequentially by two consecutive stages in one horizontal retrace period after the predetermined horizontal retrace period, and further providing a control signal to the switching transistor so that the switching transistor changes to ON state when an output of at least one stage of the shift resister rises to selection level, wherein one frame comprises the first field and the second field. The eleventh driving method can be employed in place of the first driving method.

A twelfth driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one horizontal period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected, the driving method comprising:

(1) a first field of driving the shift resister so that an output of a first stage of the shift resister rises to selection level in a predetermined horizontal retrace period after a time when a starting clock signal is inputted into the shift resister; and so that outputs of remaining stages of the shift resister rise to selection level sequentially by two consecutive stages in one horizontal retrace period in each horizontal retrace period after the predetermined horizontal retrace period, and providing a control signal to the switching transistor so that the switching transistor changes to ON state when an output of at least an N-th stage of the shift resister rises to selection level, where N is an odd number and (2) a second field of driving the shift resister so that an output of each stage of the shift resister rises to selection level sequentially by two consecutive stages in one horizontal retrace period after the predetermined horizontal retrace period after a time when a starting clock signal is inputted into the shift register, and providing a control signal to the switching transistor so that the switching transistor changes to ON state when an output of at least an M-th stage of the shift resister rises to selection level, where M is even number, wherein one frame comprises the first field and the second field. The twelfth driving method can be employed in place of the second driving method.

A thirteenth driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one vertical period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected, the driving method comprising (1) a first field of driving the shift reigstor so that an output of a first stage of the shift resister rises to selection level in a predetermined horizontal retrace period after a time when a starting clock signal is inputted into the shift resister; and so that outputs of remaining stages of the shift resister rise to selection level sequentially by n consecutive stages in each horizontal retrace period in each horizontal retrace period after the predetermined horizontal retrace period, and (2) a second, ..., an i-th, ..., an n-th fields of driving the shift resister so that outputs of the first stage to the i-th field of the shift resister rise to selection level in a predetermined horizontal retrace period after a time when a starting clock signal is inputted into the shift resister; and so that an output of each stage of the shift resister rise to selection level sequentially by n stages in each horizontal retrace period after the predetermined horizontal retrace period, and further providing a control signal to the switching transistor so that the switching transistor changes to ON state when an output of at least one stage of the shift resister rises to selection level, where $2 \leq i \leq n$ and $n \leq a$ predetermined integer, wherein one frame comprises n fields. The thirteenth driving method can be employed in place of the third driving method.

A fourteenth driving method according to the present invention is a driving method of the focal plane array comprising two-dimensionally arranged photodetectors, charge transfer devices for reading out signal charges stored in the photodetectors sequentially, transfer gates each connected between each photodetector and charge transfer device and a pixel row selection circuit connected to the transfer gates; wherein the focal plane array is operated in such a manner that the signal charges are read out from the photodetectors included in at least one horizontal line to a vertical charge transfer device in one horizontal retrace period and in one vertical period including at least one horizontal retrace period the signal charges stored in the vertical charge transfer devices are transferred to outside of a photodetector array region in which the photodetectors are two-dimensionally arranged; and wherein the pixel row selection circuit comprises a shift register and a switching transistor connected between the shift register and the transfer gates; and by combination of driving the shift resister and driving the switching transistor the horizontal line is selected so that a photodetector from which signal charge is to be read out is selected, the driving method comprising (1) a first field of driving the shift resister so that an output of a first stage of the shift resister rises to selection level in a predetermined horizontal retrace period after a time when a starting clock signal is inputted into the shift resister; and so that outputs of remaining stages of the shift resister rise to selection level sequentially by n consecutive stages in each horizontal retrace period in each horizontal retrace period after the predetermined horizontal retrace period, and providing a control signal to the switching transistor so that the switching transistor changes to ON state when outputs of a first, an (n+1)-th, a (2n+1)-th order states of the shift resister rise to selection level, and (2) a second, ..., an i-th, ..., an n-th fields of driving the shift resister so that outputs of the first stage to said i-th field of the shift resister rise to selection level in a predetermined horizontal retrace period after a time when a starting clock signal is inputted into the shift resister; and so that an output of each stage of the shift resister rise to selection level sequentially by n stages in each horizontal retrace period after the predetermined horizontal retrace period, and further providing a control signal to the switching transistor so that the switching transistor changes to ON state when outputs of at least an i-th, an (n+i)-th and a (2n+i)-th stages of said shift resister rise to selection level, where $2 \leq i \leq n$ and $n \leq a$ predetermined integer, wherein one frame comprises n fields. The fourteenth driving method can be employed in place of the fourth driving method.

BRIEF DESCRIPTION OF THE DRAWINGS

FIG. 13 is a block diagram showing clock signals which a pixel row selection circuit of the conventional image sensor shown in FIG. 10 outputs;

FIG. 14(a) is an explanatory drawing showing a cross section of A—A line in FIG. 10;

FIG. 14(b) is an explanatory drawing showing a potential on the cross section cut by A—A line in FIG. 10;

DETAILED DESCRIPTION

Figure 1:
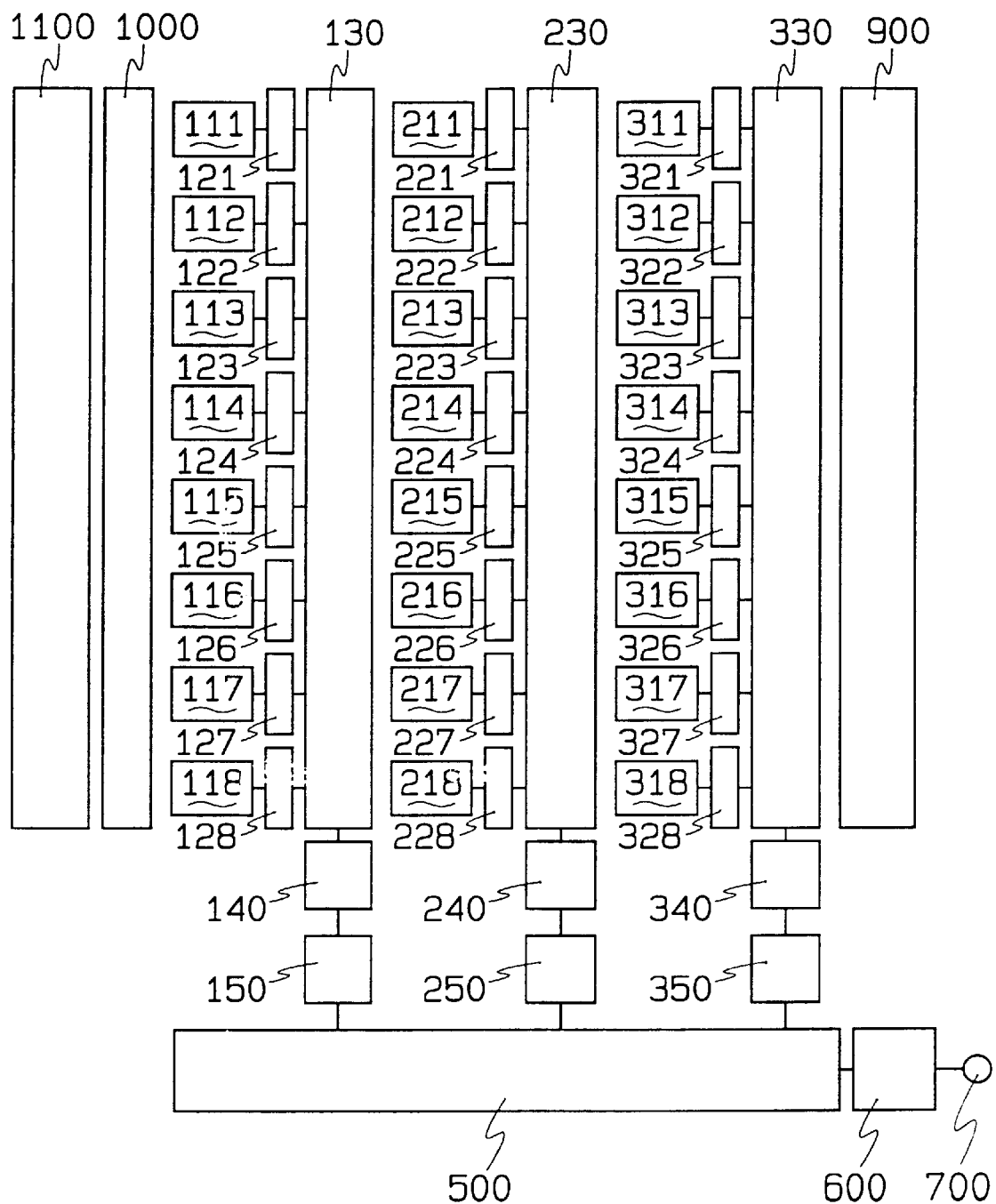
FIG. 1 is a block diagram showing Embodiment 1 of the focal plane array according to the present invention.

Hereinafter, reference is made to the embodiments of the focal plane array and the driving method therefor according to the present invention

EMBODIMENT 1

Hereinafter, the focal plane array and its driving method according to Embodiment 1 of the present invention will be explained by referring to the drawings.

Figure 10:
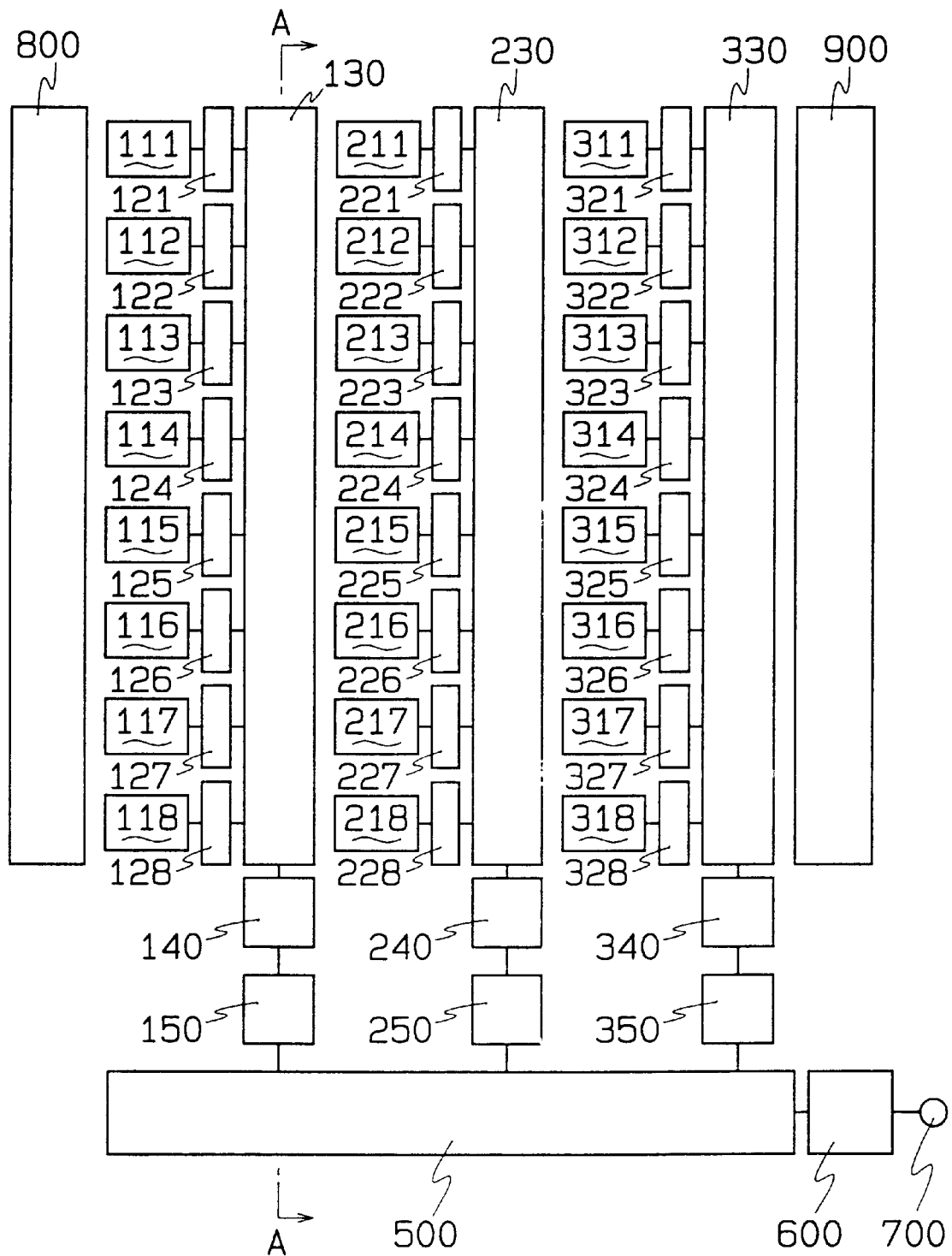
FIG. 10 is a block diagram showing the conventional focal plane array.

FIG. 1 is a block diagram showing Embodiment 1 of the focal plane array of the present invention, which is a drawing corresponding to FIG. 10 which shows an example of the conventional focal plane array. The difference of the focal plane array of the present invention from the conventional focal plane array is that, in place of the pixel row selection circuit 800 shown in FIG. 10, a shift register 1100 and a switching transistor array 1000 are provided, and the pixel row selection circuit is composed of a shift register 1100 and a switching transistor array 1000.

Figure 2:
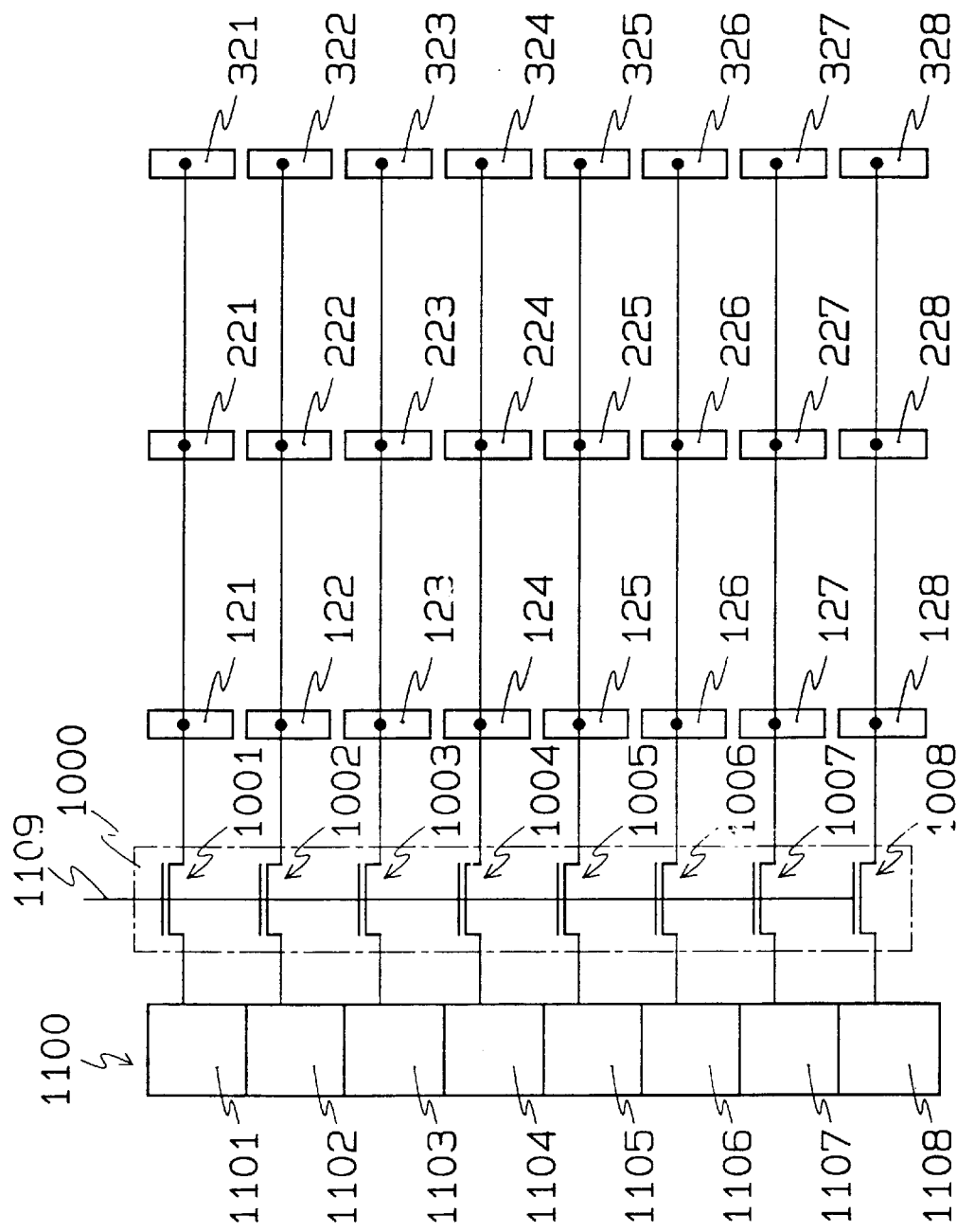
FIG. 2 is a block diagram showing the pixel row selection circuit of the focal plane array and a transfer gate shown in FIG. 1.
Figure 11:
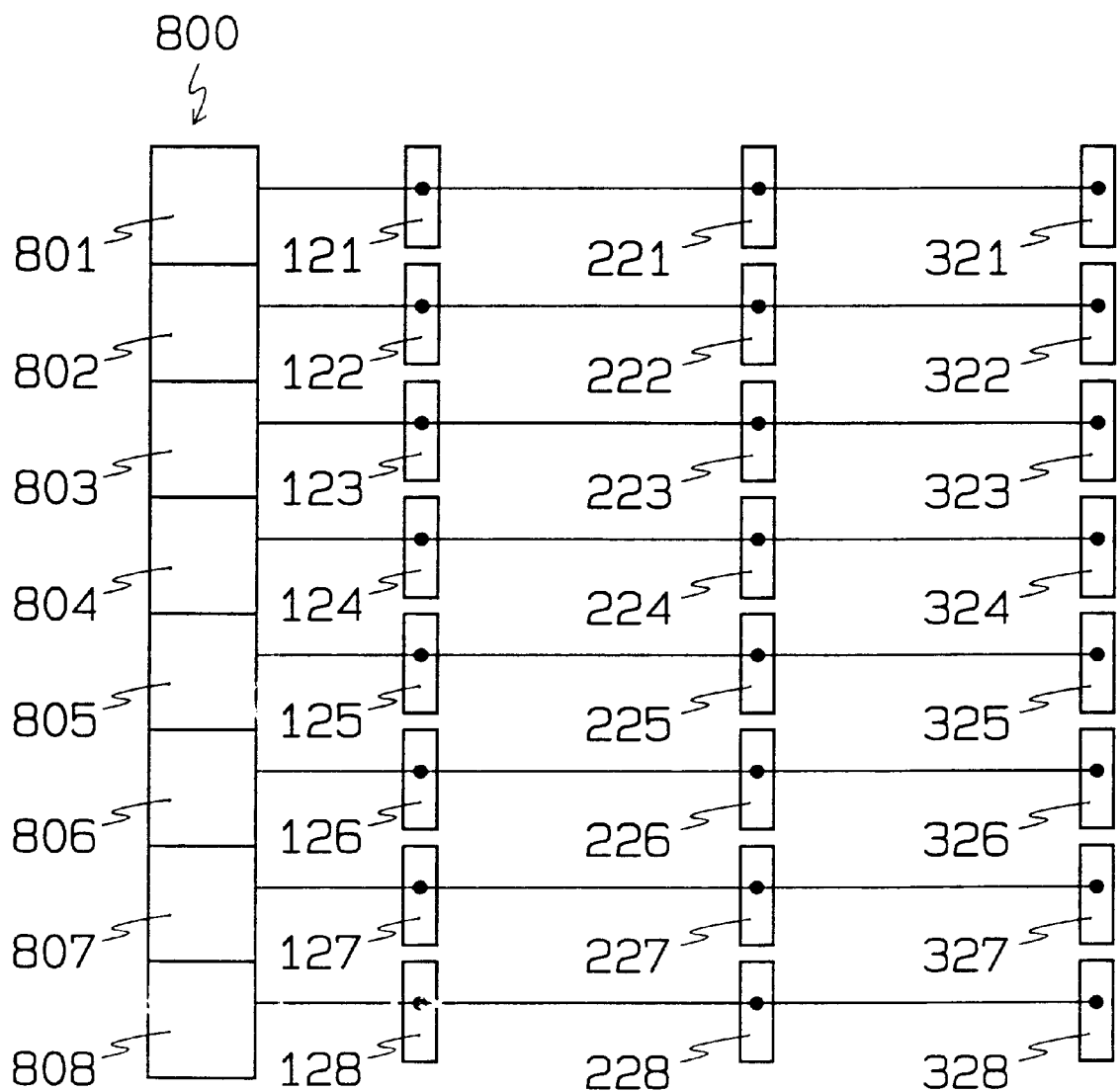
FIG. 11 is a block diagram showing a pixel row selection circuit and a transfer gate of the image sensor shown in FIG. 10.
Figure 12:
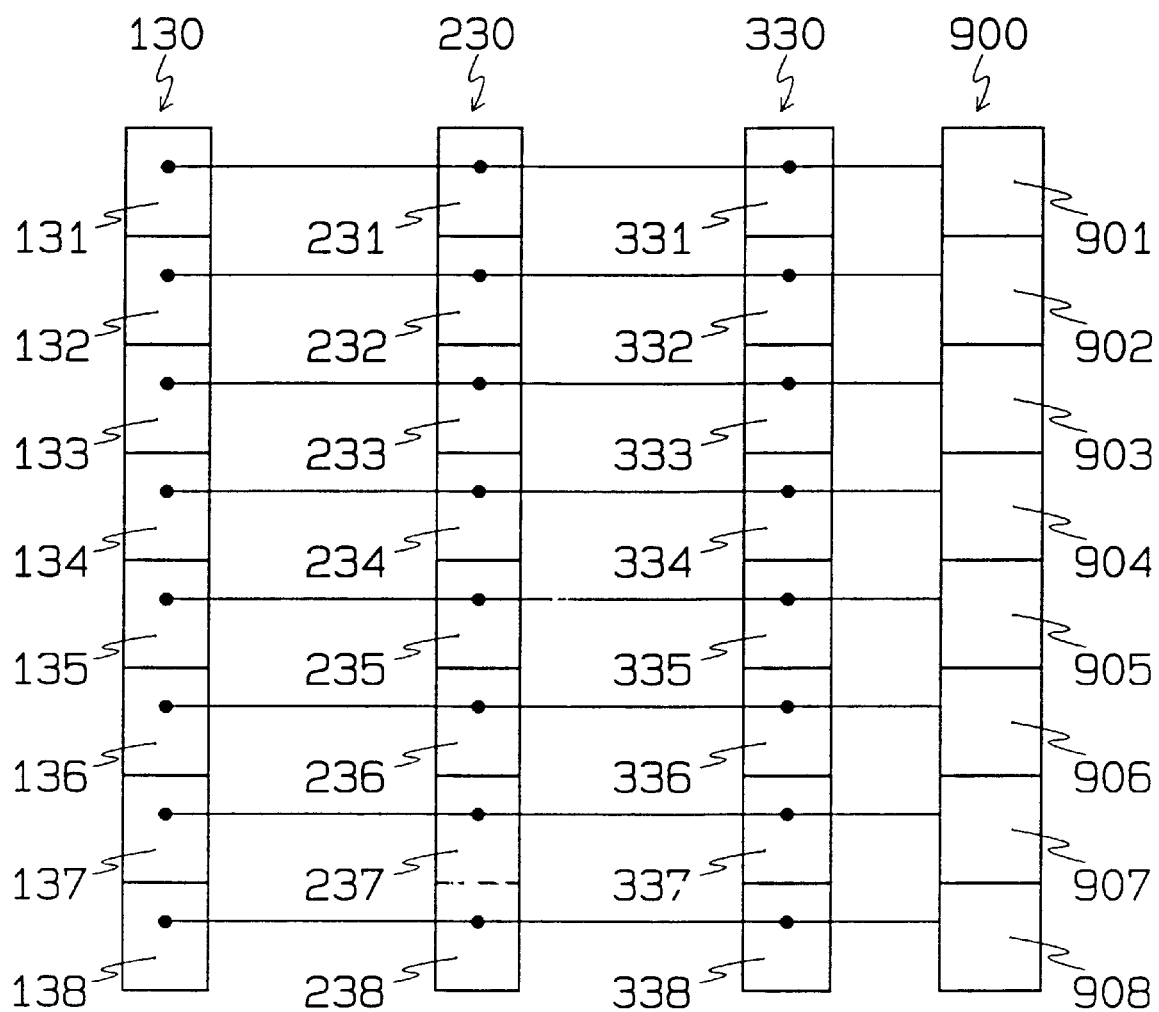
FIG. 12 is a block diagram showing a drive circuit and a vertical charge transfer device of the image sensor shown in FIG. 10.
Figure 15:
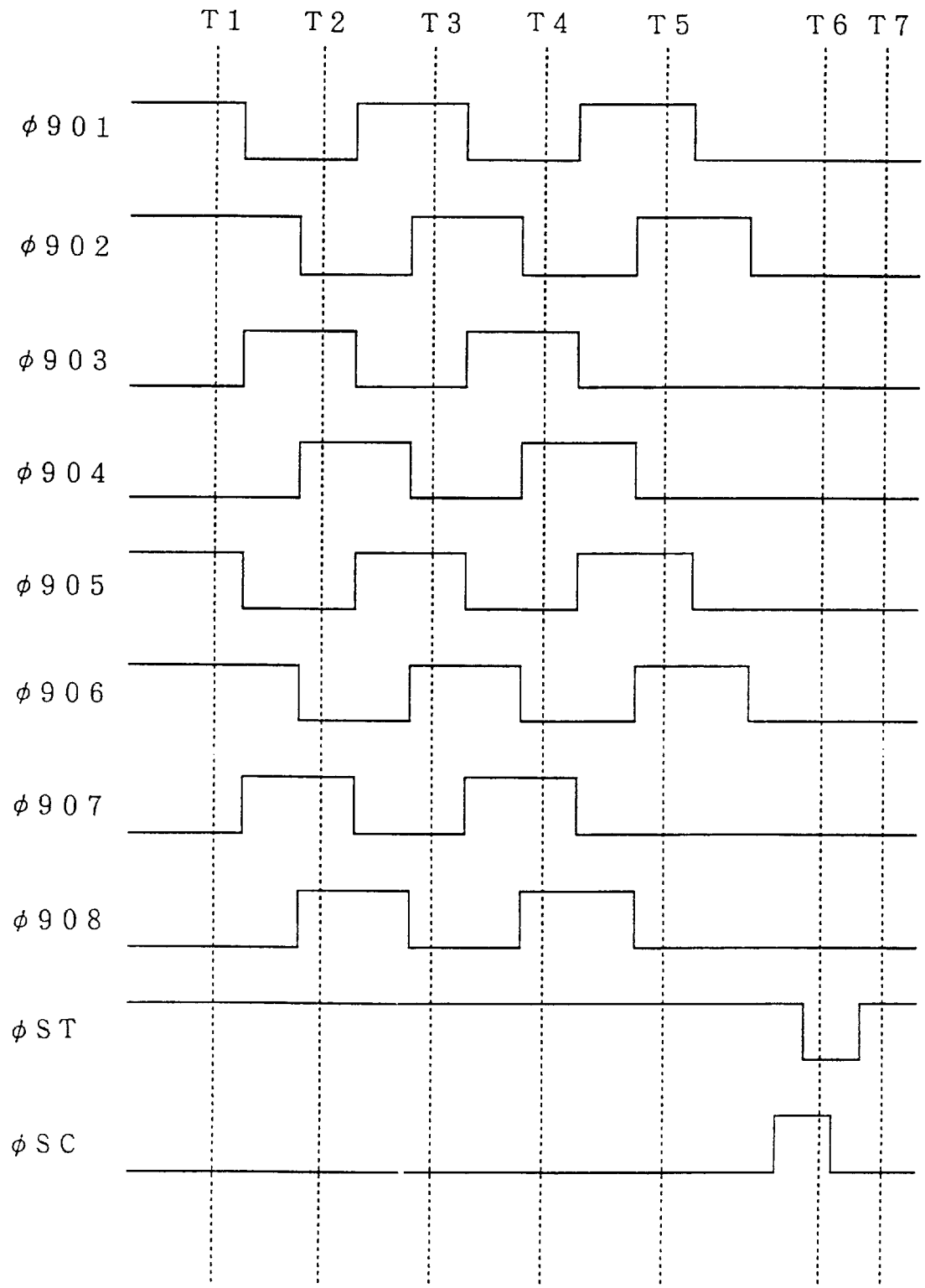
FIG. 15 is a timing chart showing an output from the drive gate electrode connected to the vertical gate electrode shown in FIG. 14.
Figure 16:
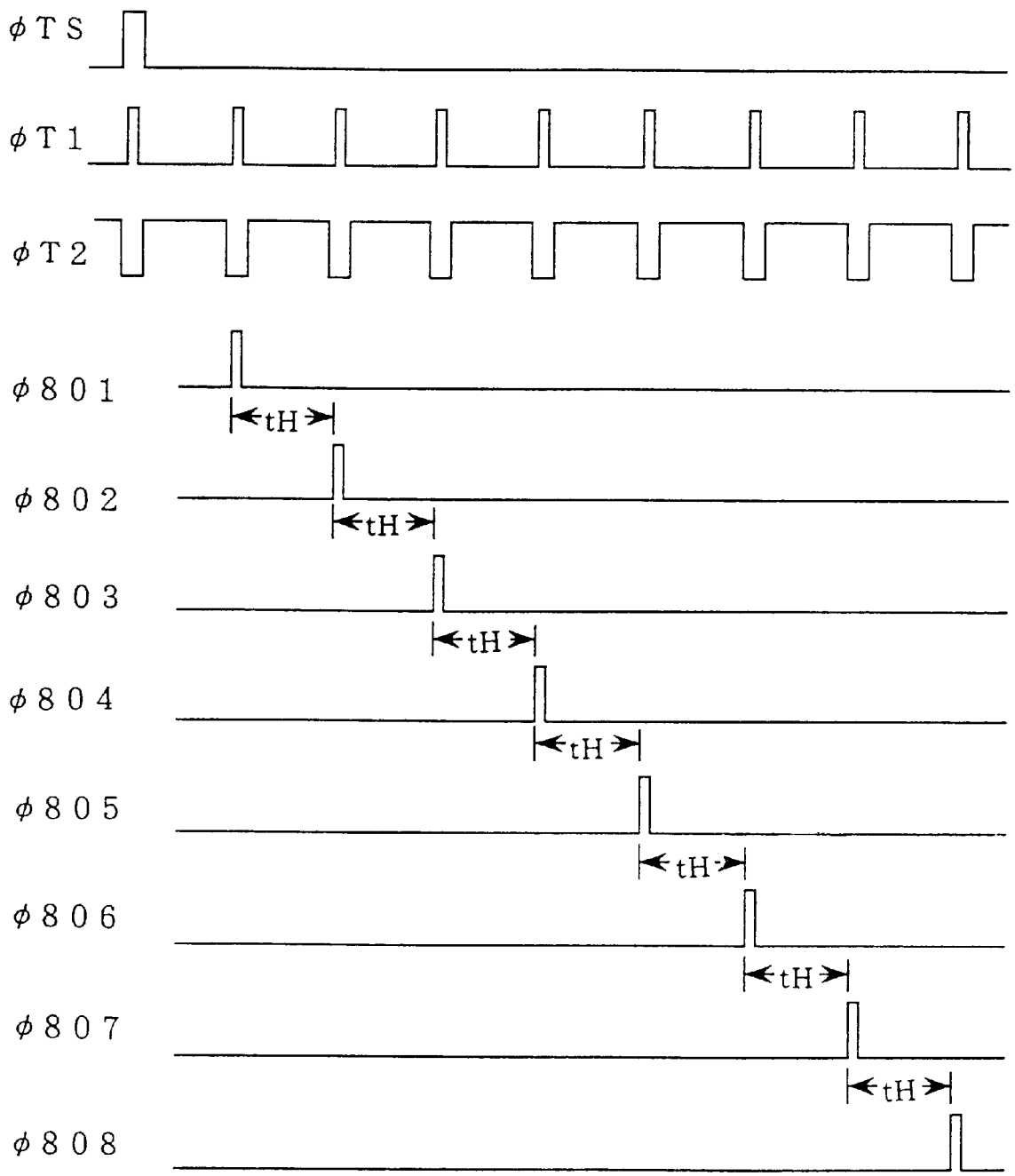
FIG. 16 is a timing chart showing clock signals outputted from the pixel row selection circuit shown in FIG. 10.

FIG. 2 is a block diagram showing the pixel row selection circuit of the focal plane array and a transfer gate shown in FIG. 1 corresponding to FIG. 11 which shows an example of the conventional pixel row selection circuit of the focal plane array and transfer gate. The output of each stage 1101 to 1108 of the shift register 1100 is to be applied to the transfer gates 121 to 128, 221 to 228, and 321 to 328, through the switching transistors 1001 to 1008 of the switching transistor array 1000. The gate electrodes of the switching transistors 1001 to 1008 are electrically connected with one another by wiring 1109. A control signal φTE for ON-OFF control of the switching transistors 1001 to 1008 is applied to the wiring 1109.

Figure 3:
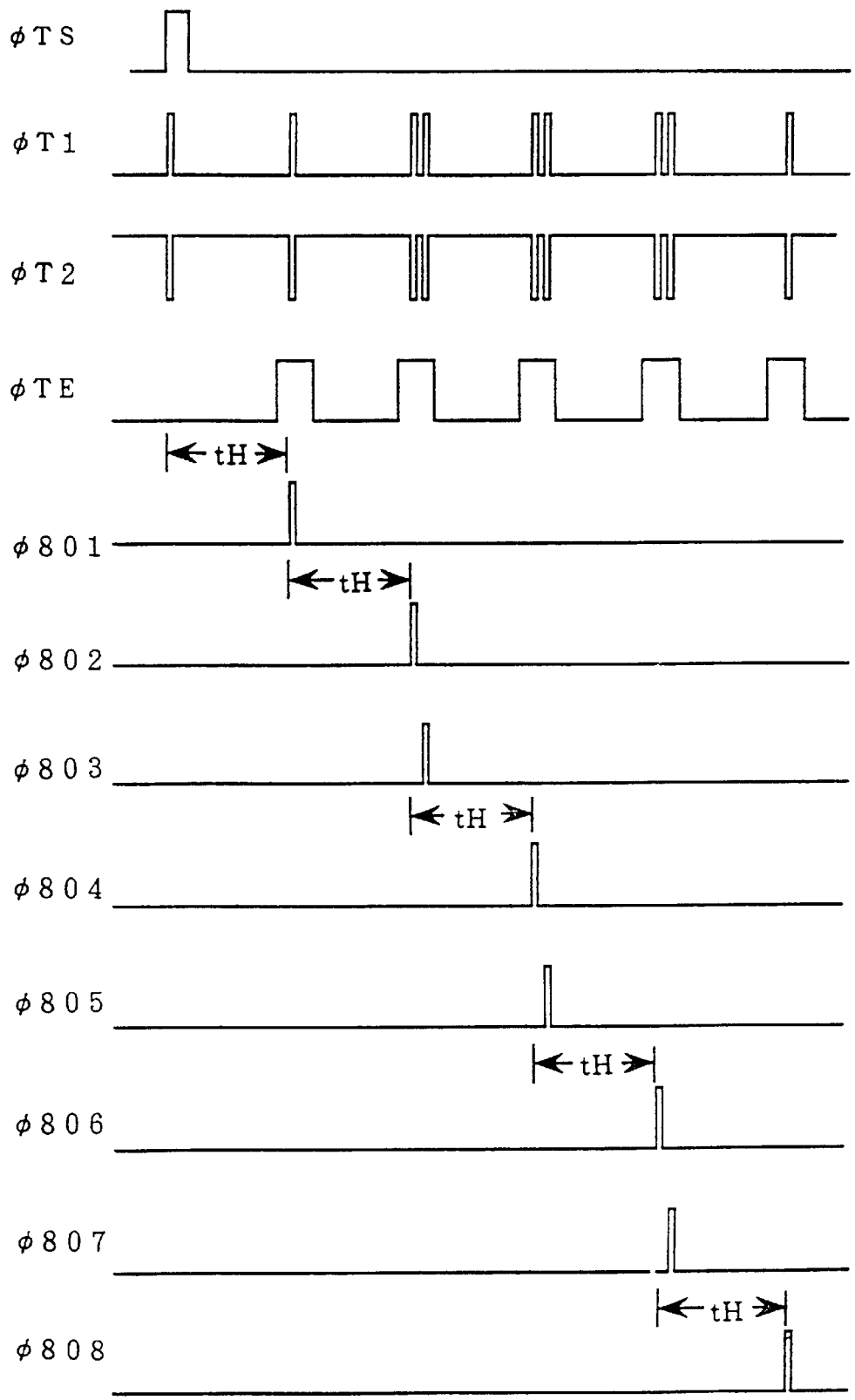
FIG. 3 is a timing chart showing the electrical clock signal to be used in the first field for selecting the pixel row of the focal plane array shown in FIG. 1.

The driving method of the focal plane array of the present invention is explained referring to FIG. 1 through FIG. 3. In the present embodiment, explanation is given for the case of operating the focal plane array according to the field storage system. In this embodiment, one frame is composed of two fields. FIG. 3 is a timing chart which shows the clock signal of electrical signal to be used in the first field for selecting the pixel row of the focal plane array shown in FIG. 1, in case of operating a focal plane array according to the field storage system.

In FIG. 3, φT1 and φT2 show respectively the electrical signals including the clock signals for driving the shift register, and a symbol φTS shows the electrical signal including the starting clock signal to determine the start of the operation of the shift register. A symbol φTE shows a control signal to be applied to the gate electrodes of the switching transistors 1001 to 1008, the control signal including the clock signal to be applied to control the operation of the switching transistor. Symbols φ801 to φ808 show the outputs in each stage of the pixel row selection circuit comprising the shift register and the switching transistor. The output of the shift register is outputted in synchronization with the signal φT1.

In the horizontal retrace period of the second horizontal period counted from the time when the signal φTS changes to H level (hereinafter referred to as "H-level") and the starting clock signal is inputted to the shift register, the signals φT1 and φT2 change to H-levels by one clock signal. Since the control signal φTE indicates H-level at this time, the switching transistor shows ON state. Accordingly, the output φ801 of the first stage of the pixel row selection circuit rises to H-level of the selection level. At this time, the signal charges stored in the photodetectors 111, 211 and 311 are read out to the vertical charge transfer devices 130, 230 and 330. The signal charges read out to the vertical charge transfer devices 130, 230 and 330 are transferred to the storage gates 140, 240 and 340 formed on the outside of the region in which the photodetectors are arrayed (photodetector array region) within the remaining time of the above-mentioned second horizontal period, in the same manner as in the conventional focal plane array.

The foregoing horizontal period is the time necessary for outputting from a focal plane array the electrical signal relating to the pixels in one row among the pixels arrayed in two dimension, comprising a horizontal retrace period and a horizontal scanning period. The horizontal retrace period (not illustrated) is the time necessary in the period after the completion of scanning of one horizontal line before the start of scanning of the next horizontal line in a certain picture frame. The horizontal scanning period (not illustrated) is the time necessary for scanning one horizontal line.

In the next horizontal retrace period of the horizontal period to the previous second horizontal period, the signals φT1 and φT2 change to H-levels by two clock signals. As the control signal φTE indicates H-level at this time, the switching transistor changes to ON state. Accordingly, the outputs φ802 and φ803 of the second stage and the third stage of the pixel row selection circuit rise to H-levels (selection levels). At this time, the signal charges stored in the photodetectors 112, 212, 312, 113, 213 and 313 are read out to the vertical charge transfer devices 130, 230, and 330. The signal charges in the photodetectors 112 and 113 are mixed in the vertical charge transfer device 130; the signal charges in the photodetectors 212 and 213 are mixed in the vertical charge transfer device 230; the signal charges in the photodetectors 312 and 313 are mixed in the vertical charge transfer device 330; and they are respectively read out as one signal charge. Thereafter, they are transferred to the storage gates 140, 240 and 340, in the same manner as in the horizontal period.

Further, similarly, the outputs φ804, φ805 of the fourth stage and fifth stage of the pixel row selection circuit rise to H-levels in the next horizontal retrace period, and the outputs φ804 and φ805 of the fourth stage and fifth stage of the pixel row selection circuit rise to H-levels in the next horizontal retrace period, and the output φ808 of the eighth stage of the pixel row selection circuit rises to H-level in the last horizontal retrace period, by which reading out of all the signal current from the photodetector is completed.

Figure 4:
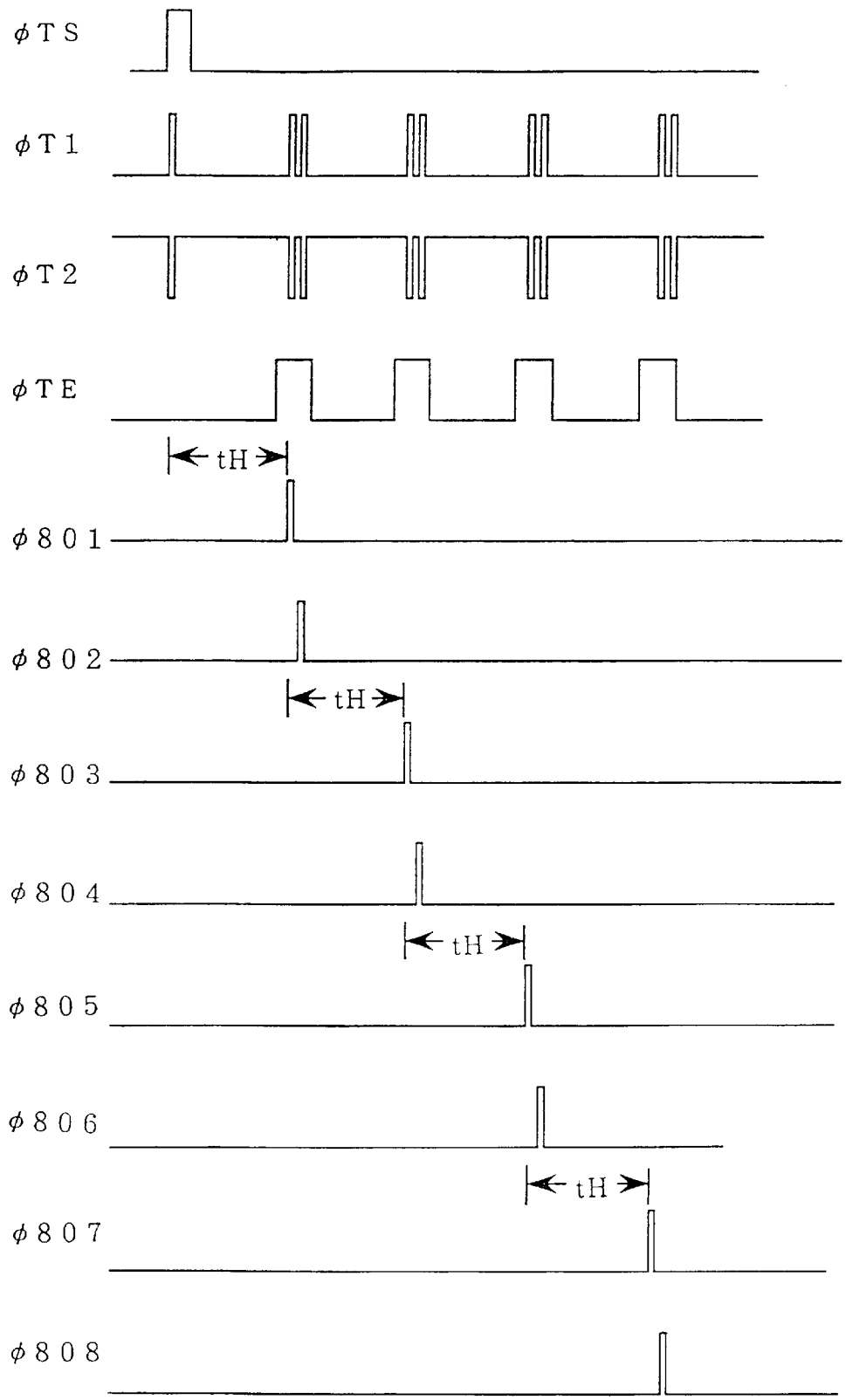
FIG. 4 is a timing chart showing the clock signal to be used in the second field for selecting the pixel row of the focal plane array shown in FIG. 1.

With respect to the driving method of the focal plane array in the second field, explanation is given by referring to FIG. 1, FIG. 2 and FIG. 4. FIG. 4 is a timing chart showing the clock signal to be used in the second field. The points of its difference from the one of FIG. 3 are that, in the second horizontal retrace period from the time when the signal φTS has changed to H-level and a starting clock signal is inputted to the shift register, the signals φT1 and φT2 change to H-levels by two clock signals, and the output φ801 of the first stage and the output φ802 of the second stage of the pixel row selection circuit rise to H-level, and in the subsequent horizontal retrace periods, the signals φT1 and φT2 change to H-levels by two clock signals, and the output of the shift register rises to H-level by two stages. Accordingly, in each horizontal period, the signal charge is read out by two horizontal lines.

As described above, one frame (corresponding to one picture frame in television screen) is obtained by the two fields shown in FIGS. 3 and 4, and by repeating the operation methods as explained referring to FIGS. 3 and 4, the focal plane array can be operated by adapting to the interlace scanning system of ordinary television sets.

When the horizontal lines of the photodetector are designated to be L1, L2, L3, L4, L5, L6, L7 and L8 in order vertically, and at the same time the horizontal lines to which the signal charges are read out are shown in one parenthesis, the lines in the field shown in FIG. 3 are (L1), (L2, L3), (L4, L5), (L6, L7) and (L8), and those in the field shown in FIG. 4 are (L1, L2), (L3, L4), (L5, L6), and (L7, L8). In other words, by changing the pairs of the horizontal lines in which the signal charges are read out for every field, the interlace scanning is carried out by a field storage system.

In this embodiment, it is designed to keep H-level during the period in which the control signal φTE includes the two clock signals of the signals φT1, φT2 generated in one horizontal retrace period. However, the control signal φTE may change to H-level when the signal φT1 related with the horizontal line which is desired to be selected has changed to H-level among the stages of the shift registers. Alternatively, in synchronization with the signal φT1, the control signal φTE may be made H-level for two clock signals in one horizontal retrace period. Furthermore, the level of the control signal φTE in the period other than the period in which the signal φT1 is let to be changed to H-level is optional.

As a switching transistor shown in FIG. 2, a MOS transistor or a bipolar transistor may be used. In view of the point that the manufacture can be made in the same process as that employed for other elements constituting the focal plane array (e.g., CSD), use of MOS transistor is desirable.

EMBODIMENT 2

Embodiment 2 of the driving method of the focal plane array of the present invention will be explained referring to the drawings. In this embodiment, explanation is given for operating the focal plane array according to the frame storage system. The structure of the focal plane array is the same as that of Embodiment 1 shown in FIGS. 1 and 2.

Figure 5:
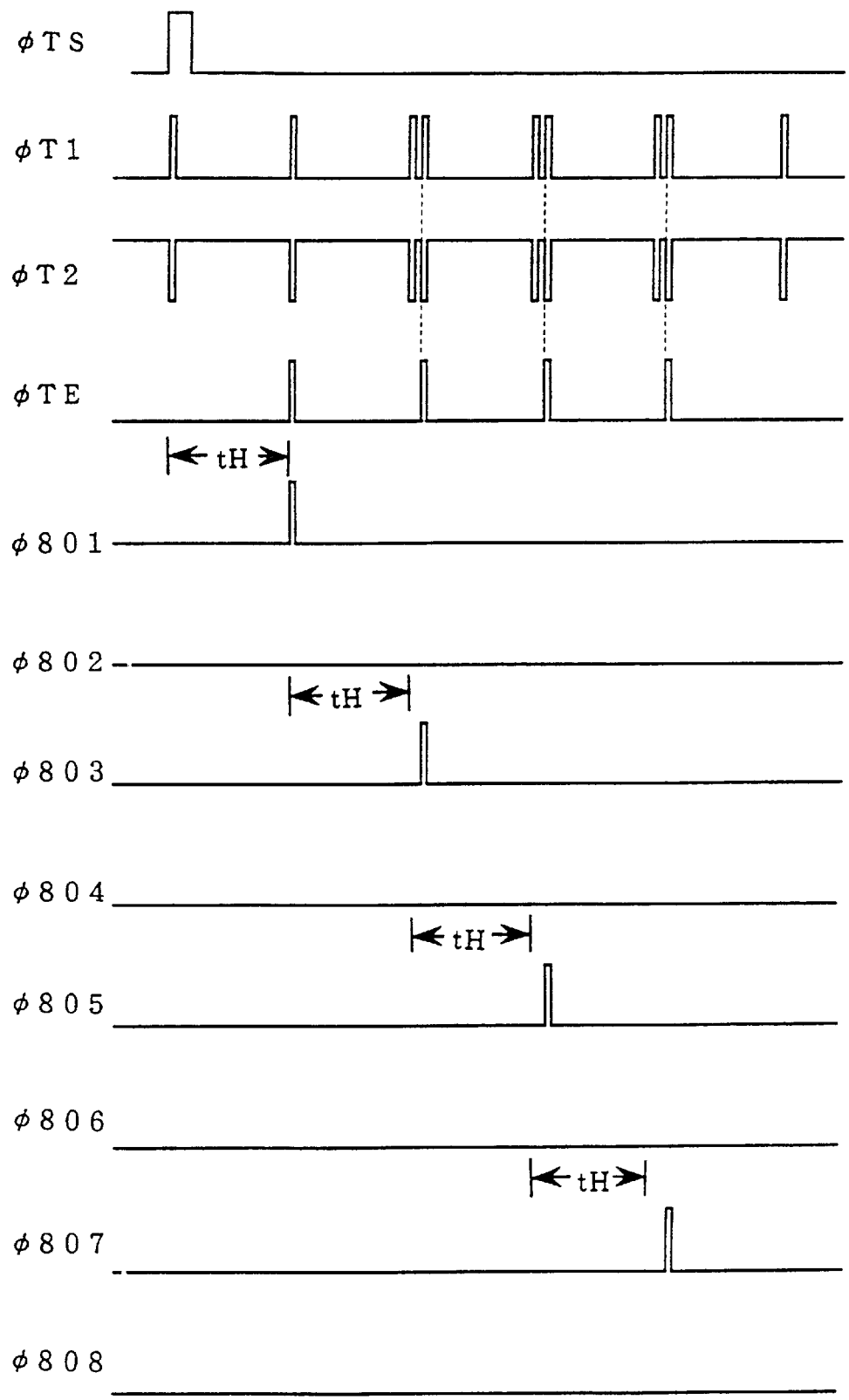
FIG. 5 is a timing chart showing the clock signal to be used in the first field in case in which the focal plane array shown in FIG. 1 is operated according to the frame storage system.
Figure 6:
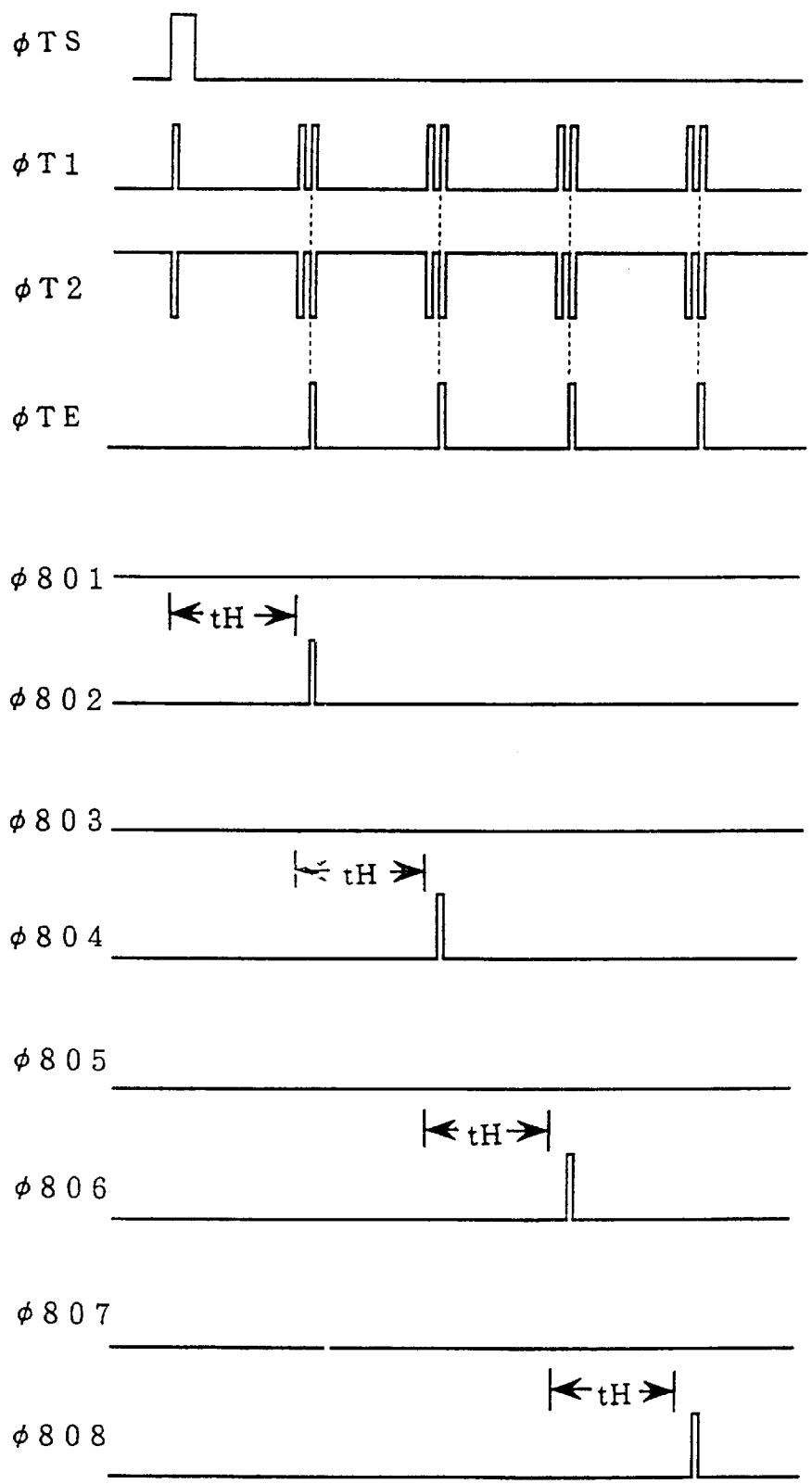
FIG. 6 is a timing chart showing the clock signal to be used in the second field in case in which the focal plane array shown in FIG. 1 is operated according to the frame storage system.

FIG. 5 is a timing chart showing the clock signal to be used in the first field in case of operating the focal plane array shown in FIG. 1 according to the frame storage system. FIG. 6 is a timing chart showing the clock signal to be used in the second field. The signal φTS and signals φT1 and φT2 shown in FIG. 5 are the same as the signal φTS and signals φT1 and φT2 shown in FIG. 3. The signal φTS and signals φT1 and φT2 shown in FIG. 6 are the same as the signal φTS and signals φT1 and φT2 shown in FIG. 4. The difference between the embodiment 1 and this embodiment 2 is the timing in which the control signal φTE changes to H-level, namely, the timing of the generation of clock signal. In the case shown in FIG. 5, the timing in which the control signal φTE changes to H-level is only while the period in which the signals φT1 and φT2 indicate H-level which are the N-th (N represents odd number), i.e., the first, the third, the fifth and the seventh orders counted from the time when the signal φTS changes to H-level. In the case of FIG. 6, the timing in which the control signal φTE changes to H-level is only while the period in which the signals φT1 and φT2 indicate H-level which are the M-th (M represents even number, i.e., the second, the fourth, the sixth and the eighth orders counted from the time when the signal φTS changes to H-level. In other words, in the first field, the control signal φTE, which is a control signal of the switching transistor, changes to H-level so that the switching transistor changes to ON state only when the output of the N-th stage (N: odd number) of the shift register rises to the selection level. Also, in the second field, the control signal φTE, which is a control signal of the switching transistor, rises to H-level so that the switching transistor changes to ON state only when the output of the even number order of the shift register changes to the selection level.

Accordingly, in the first field as shown in FIG. 5, in the second horizontal retrace period counted from the time when the starting clock signal is inputted to the shift register, the output of the first stage of the shift register changes to the selection level, and the horizontal line L1 is selected to read out the signal charge of the horizontal line L1, and thereafter, the horizontal line L3, L5 or L7 is sequentially selected on each horizontal retrace period. Further, in the following second field, in the second horizontal retrace period counted from the time when the starting clock signal is inputted to the shift register, the output of the second stage of the shift register changes to the selection level, and the horizontal line L2 is selected to read out the signal charge of the horizontal line L2, and thereafter, the horizontal line L4, L6 or L8 is sequentially selected on each horizontal retrace period, so that the focal plane array can be operated in a manner to meet the interlace scanning system of ordinary television sets.

In this embodiment, the H-level is continued for a period in which the control signal φTE includes one clock signal of the signals φT1 and φT2 generated in one horizontal retrace period. However, the control signal φTE may change to H-level only when the signal φT1 relating to the horizontal line which is desired to be selected. Further, the level of the control signal φTE in the period other than the period in which the signal φT1 indicates H-level is optional.

EMBODIMENT 3

Embodiment 3 of the driving method of the focal plane array of the present invention will be explained.

In Embodiment 1 and Embodiment 2, as an example of operating the focal plane array to match the interlace scanning system of ordinary television sets, the focal plane array is operated in such a manner that one frame of picture is composed of two fields. However, in the interlace scanning system in the focal plane array of the present invention, one picture frame may be composed of an optional number of fields of more than three. In the focal plane array according to the present invention, with the structure as shown in FIG. 1 and FIG. 2 maintained, by only changing the signals φT1 and φT2 and control signal φTE, one frame (one picture) can be composed of an optional number of fields of more than three.

For example, in a method of driving the focal plane array so as to constitute one frame by n fields, in the first field, the shift register is driven so that the output of the first stage of the shift register rises to a selection level in the second horizontal retrace period counted from the time of the input of the starting clock signal in the shift register, and in each horizontal retrace period after the second horizontal retrace period, the shift register is driven so as to make the output of the shift register a selection level by n stages. Also, in the i-th field, the shift register is driven so as to make the outputs of the shift register from the first stage to the i-th stage, a selection level in the second horizontal retrace period from the time of the input of the starting clock signal to the shift register. Further, in each horizontal retrace period after the second horizontal retrace period, the shift register is driven so as to let the output of the shift register a selection level by n stages. Furthermore, when the output of at least one stage of the shift register rises to the selection level, a control signal is provided to the switching transistor so as to let the switching transistor ON state. Here, the number n is a positive number larger than three, and i is a positive number having the initial value of two and the maximum amount of n, to be added by one on each field.

As an example of driving the focal plane array as shown in FIG. 1 and FIG. 2 according to the driving method as stated above, explanation is given for the case of constituting one frame by three fields.

First, in the first field, the output of the first stage of the shift register rises to a selection level in the second horizontal retrace period counted from the time of the input of the starting clock signal in the shift register. In the third horizontal retrace period, the outputs of the second stage, the third stage and the fourth stage of the shift register simultaneously rise to the selection levels. In the fourth horizontal retrace period, the outputs of the fifth stage, the sixth stage and the seventh stage of the shift register simultaneously change to the selection levels. In the fifth horizontal retrace period, the output of the eighth stage of the shift register rises to the selection level.

In the second field, the outputs of the first stage and the second stage of the shift register rise to the selection levels in the second horizontal retrace period counted from the time of the input of the starting clock signal in the shift register. In the third horizontal retrace period, the outputs of the third stage, fourth stage and fifth stage of the shift register simultaneously rise to the selection levels. In the fourth horizontal retrace period, the outputs of the sixth stage, the seventh stage and the eighth stage of the shift register simultaneously rise to the selection levels.

In the third field, the outputs of the first stage, the second stage and the third stage of the shift register rise to the selection levels in the second horizontal retrace period counted from the time of the input of the starting clock signal to the shift register. In the third horizontal retrace period, the outputs of the fourth stage, the fifth stage and the sixth stage of the shift register simultaneously rise to the selection levels. In the fourth horizontal retrace period, the outputs of the seventh stage and the eighth stage of the shift register simultaneously rise to the selection levels.

EMBODIMENT 4

There is explained another embodiment of a method of driving the focal plane array so as to constitute one frame by n fields.

In this embodiment, in the first field, the shift register is driven so that the output of the first stage of the shift register rises to a selection level in the second horizontal retrace period counted from the time of the input of the starting clock signal in the shift register, and in each horizontal retrace period after the second horizontal retrace period, the shift register is driven so as to let the output of each remaining stage of the shift register sequentially rise to selection level by the consecutive stages in one horizontal retrace period, and when the output of at least the first, the (n+1)-th, the (2n+1)-th, . . . stages of the shift register rises to a selection level, control signal is provided to the switching transistor so as to let the switching transistor change to ON state, and in the first field, the shift register is driven so that the output of the shift register from the first stage to the i-th stage rises to the selection level in the horizontal retrace period coming on the second time when the starting clock signal is inputted to the shift register, and in each horizontal retrace period following the second horizontal retrace period, the shift register is driven to let the outputs of the shift register selection level by n stages, and when the output of at least the first, (n+1)-th, (2n+1)-th, . . . stages of the shift register rise to a selection level, control signal is provided to the switching transistor so as to let the switching transistor change to ON state. The number n is a positive number larger than three, and i is a positive number having the initial value of two and the maximum amount of n, to be added by one on each field.

As an example of driving the focal plane array as shown in FIG. 1 and FIG. 2 according to the driving method as stated above, explanation is given for the case in which one frame is constituted of three fields.

In the first field, the output of the first stage of the shift register rises to a selection level in the second horizontal retrace period counted from the time of the input of the starting clock signal in the shift register. In the third horizontal retrace period, the outputs of the second stage, the third stage and the fourth stage of the shift register rise to the selection level. In the fourth horizontal retrace period, the outputs of the fifth stage, the sixth stage and the seventh stage of the shift register rise to the selection level. In the fifth horizontal retrace period, the output of the eighth stage of the shift register rises to the selection level. However, in the first field, only when the outputs of the first, fourth, and seventh stage of the shift register rise to the selection level, the switching transistor changed to ON state.

In the second field, the outputs of the first stage and the second stage of the shift register change to the selection levels in the second horizontal retrace period counted from the time of the input of the starting clock signal in the shift register. In the third horizontal retrace period, the outputs of the third stage, the fourth stage and the fifth stage of the shift register change to the selection level. In the fourth horizontal retrace period, the outputs of the sixth stage, the seventh stage and the eighth stage of the shift register simultaneously change to the selection level. However, in the second field, only when the outputs of the second, fifth and eighth stage of the shift register rise to the selection level, the switching transistor changed to ON state.

In the third field, the outputs of the first stage, the second stage and the third stage of the shift register rise to the selection levels in the second horizontal retrace period counted from the time of the input of the starting clock signal in the shift register. In the third horizontal retrace period, the outputs of the fourth stage, the fifth stage and the sixth stage of the shift register rise to the selection levels. In the fourth horizontal retrace period, the outputs of the seventh stage and eighth stage of the shift register rise to the selection level. However, in the third field, only when the outputs of the third and sixth stage of the shift register rise to the selection levels, the switching transistor changed to the ON state.

Accordingly, in the first field, only when the outputs of the shift registers corresponding to the horizontal lines of the first, fourth, and seventh stages from the above change to the selection level, the switching transistor changed to the ON state. In the second field, only when the outputs of the shift registers corresponding to the second, fifth and eighth stages vertically change to the selection levels, the switching transistor changed to the ON state. And, in the third field, only when the outputs of the shift registers corresponding to the third and the sixth stage from vertically rise to the selection levels, the switching transistor changed to ON state.

EMBODIMENT 5

Figure 7:
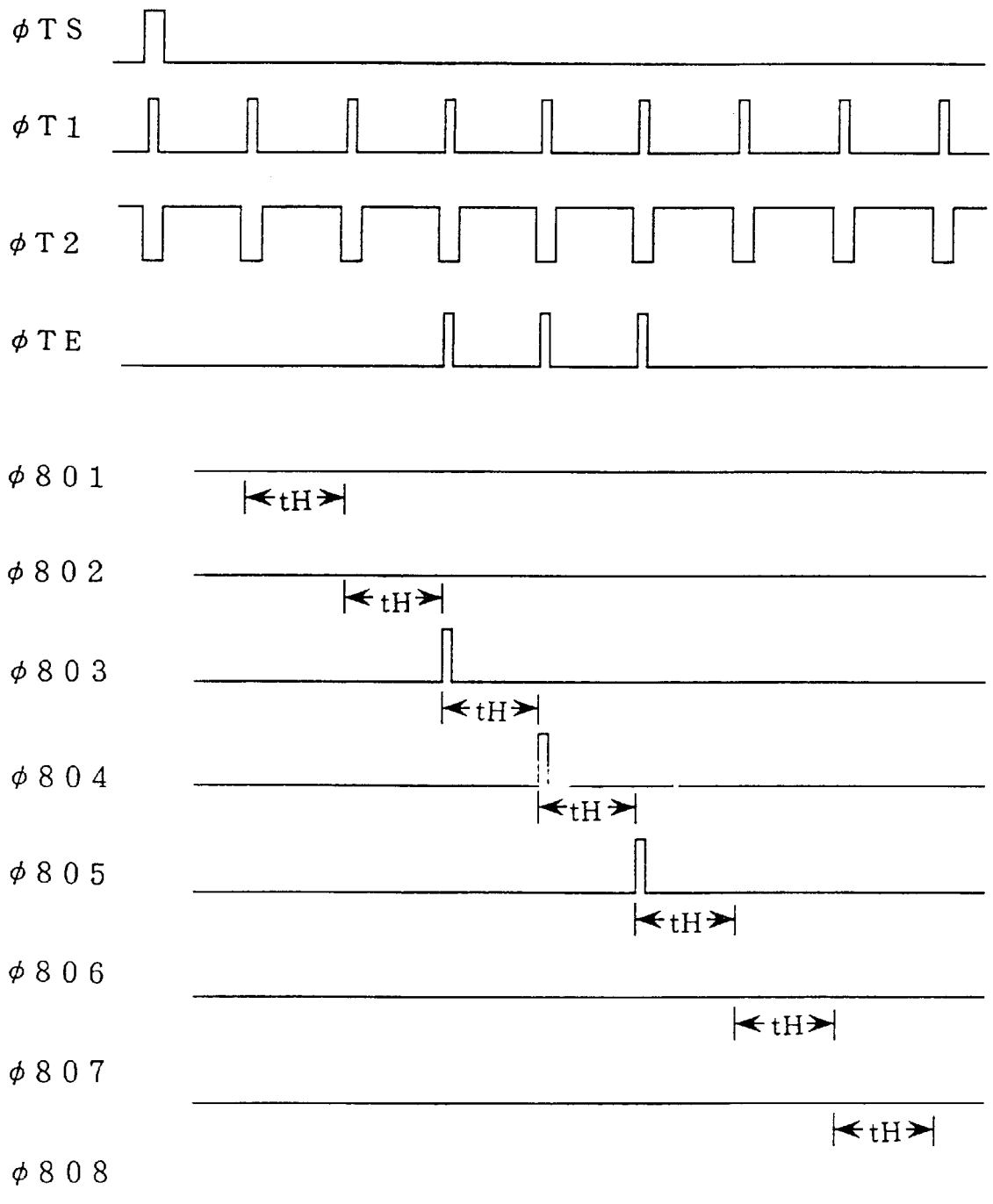
FIG. 7 is a timing chart showing the clock signal to be inputted to the focal plane array according to Embodiment 5 of the driving method of the present invention.

Embodiment 5 of the driving method of the focal plane array of the present invention will be explained. FIG. 7 is a timing chart showing the clock signal to be inputted to the focal plane array in the driving method of the focal plane array of the present invention. In this embodiment, the elements constituting the focal plane array may be the same as the focal plane arrays shown in FIGS. 1 and 2. Also, in this embodiment, the signals φT1 and φT2 indicate H-level by one clock signal one by one horizontal retrace period, and in this respect the driving method of the present embodiment is the same as that of the conventional focal plane array. However, the control signal φTE changes to H-level only while the period in which the signals φT1 and φT2 indicate H-level which are the third, the fourth and the fifth periods counted from the moment when the signal φTS changes to H-level.

By inputting such a control signal φTE, in the horizontal retrace period of the fourth order from the time when the signal φTS changes to H-level, only the output φ803 on the third stage of the pixel row selection circuit rises to H-level, in the fifth horizontal retrace period, only the output φ804 on the fourth stage of the pixel row selection circuit rises to H-level, and in the sixth horizontal retrace period, only the output φ805 on the fifth stage of the pixel row selection circuit changes to H-level. Accordingly, only the signal charges of horizontal lines L3, L4, and L5 which are the consecutive plural horizontal lines in the vertical direction are sequentially read out. In this case, the outputs φ801, φ802, φ806, φ807 and φ808 of the first stage, the second stage, the sixth stage, the seventh stage, and the eighth stage, respectively of the pixel row selection circuit do not rise to H-level, and the signal charges of the horizontal lines L1, L2, L6, L7 and L8 are not read out.

Consequently, according to the driving method of the focal plane array of the present embodiment, effective images can be displayed only in the vicinity of the central region of one frame corresponding to the horizontal line into which the signal charges are read out, and only the regions related with the desired range of image can be scanned. In this embodiment, the signal charges of the horizontal lines L3, L4 and L5 have been read out, but the horizontal line for reading out the signal charge can be readily changed by changing the control signal φTE. Accordingly, within one picture frame, the spot to be displayed can be set optionally.

The driving method of the focal plane array according to this embodiment is also applicable to the case in which ordinary interlace scanning system is carried out.

EMBODIMENT 6

Embodiment 6 of the driving method of the focal plane array according to the present invention will be explained.

Figure 8:
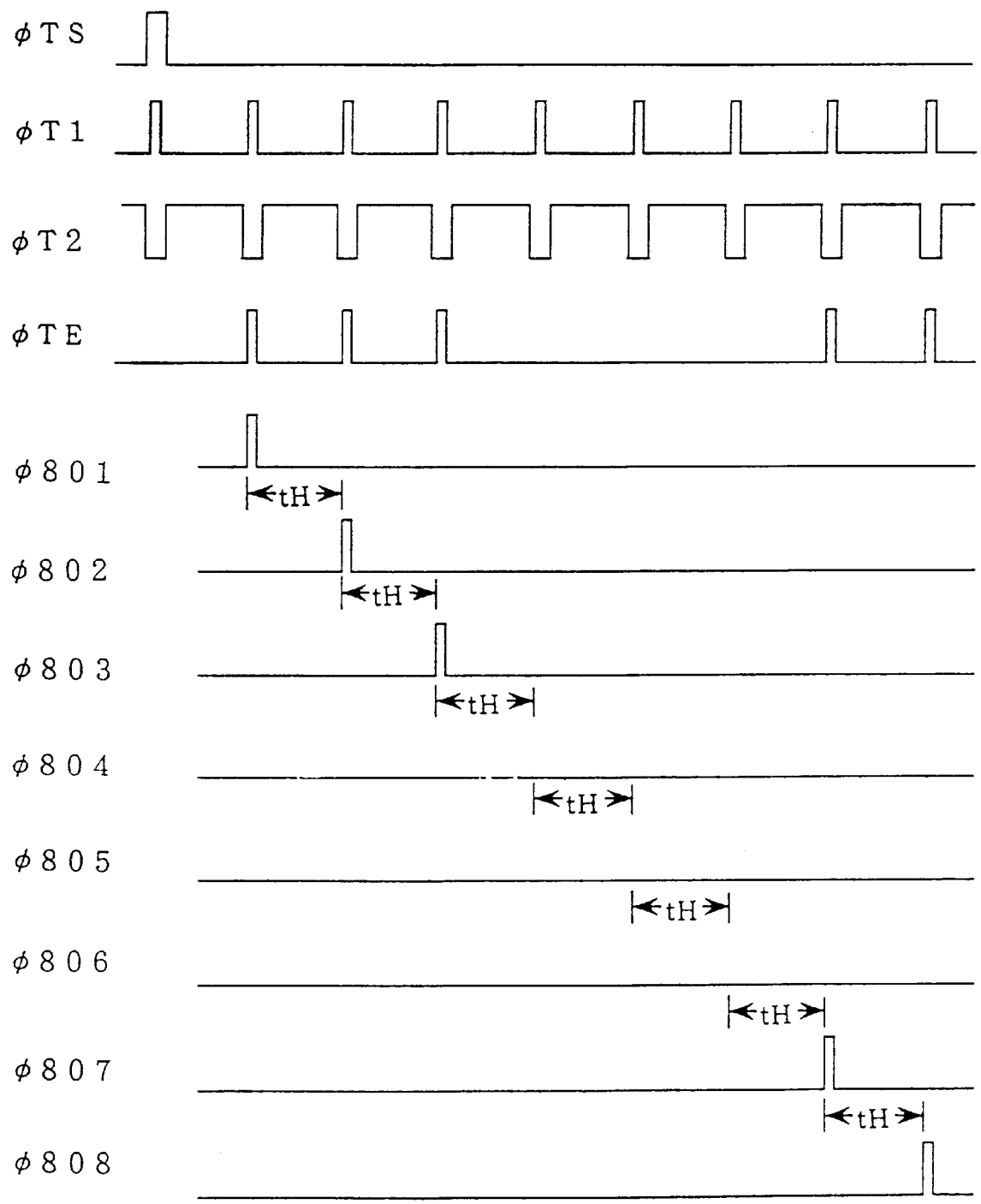
FIG. 8 is a timing chart showing the clock signal to be inputted to the focal plane array according to Embodiment 6 of the driving method of the present invention.

FIG. 8 is a timing chart showing the clock signal to be inputted to the focal plane array in the driving method of the focal plane array according to the present invention. In this embodiment, the elements constituting the focal plane array may be the same as the focal plane arrays shown in FIGS. 1 and 2. Also, in this embodiment, the signals φT1 and T2 indicate H-level by every one clock signal in each horizontal retrace period, and in this respect the driving method of the present embodiment is the same as that of the conventional focal plane array. However, the control signal φTE changes to H-level only while the period in which the signals φT1 and φT2 indicate H-level which are the first, second, third, seventh and eighth orders counted from the moment when the signal φTS changes to H-level.

By inputting such a control signal φTE, in the horizontal retrace period of the second order from the time when the signal φTS changes to H-level, only the output φ801 of the first stage of the pixel row selection circuit rises to H-level, in the horizontal retrace period of the third order, only the output φ802 on the second stage of the pixel row selection circuit rises to H-level, in the horizontal retrace period of the fourth order, only the output φ803 on the third stage of the pixel row selection circuit rises to H-level, in the eighth horizontal retrace period, only the output φ807 on the seventh stage of the pixel row selection circuit rises to H-level, and in the horizontal retrace period of the ninth order, only the output φ808 of the eighth stage of the pixel row selection circuit rises to H-level. Accordingly, only the signal charges of a group of horizontal lines L1, L2, and L3 comprising the consecutive plural horizontal lines in the vertical direction and other group of horizontal lines L7 and L8 comprising the consecutive plural horizontal lines in the vertical direction are sequentially read out. In this case, the outputs φ804, φ805 and φ806 of the fourth stage, the fifth stage and the sixth stage of the pixel row selection circuit do not rise to H-level, and the signal charges of the horizontal lines L4, L5 and L6 are not read out.

Consequently, according to the driving method of the focal plane array of the present embodiment, effective images can be displayed only in the region corresponding to the horizontal line into which the signal charges are read out, and only the regions related with the desired range of image can be scanned. In this embodiment, the signal charges of the horizontal lines L1, L2, L3, L7 and L8 have been read out, but the horizontal line for reading out the signal charge can be readily changed by changing the control signal φTE. Accordingly, within one picture frame, the spot to be displayed can be optionally set.

The driving method of the focal plane array according to this embodiment is also applicable to the case in which ordinary interlace scanning system is carried out.

EMBODIMENT 7

Embodiment 7 of the driving method of the focal plane array according to the present invention will be explained.

Figure 9:
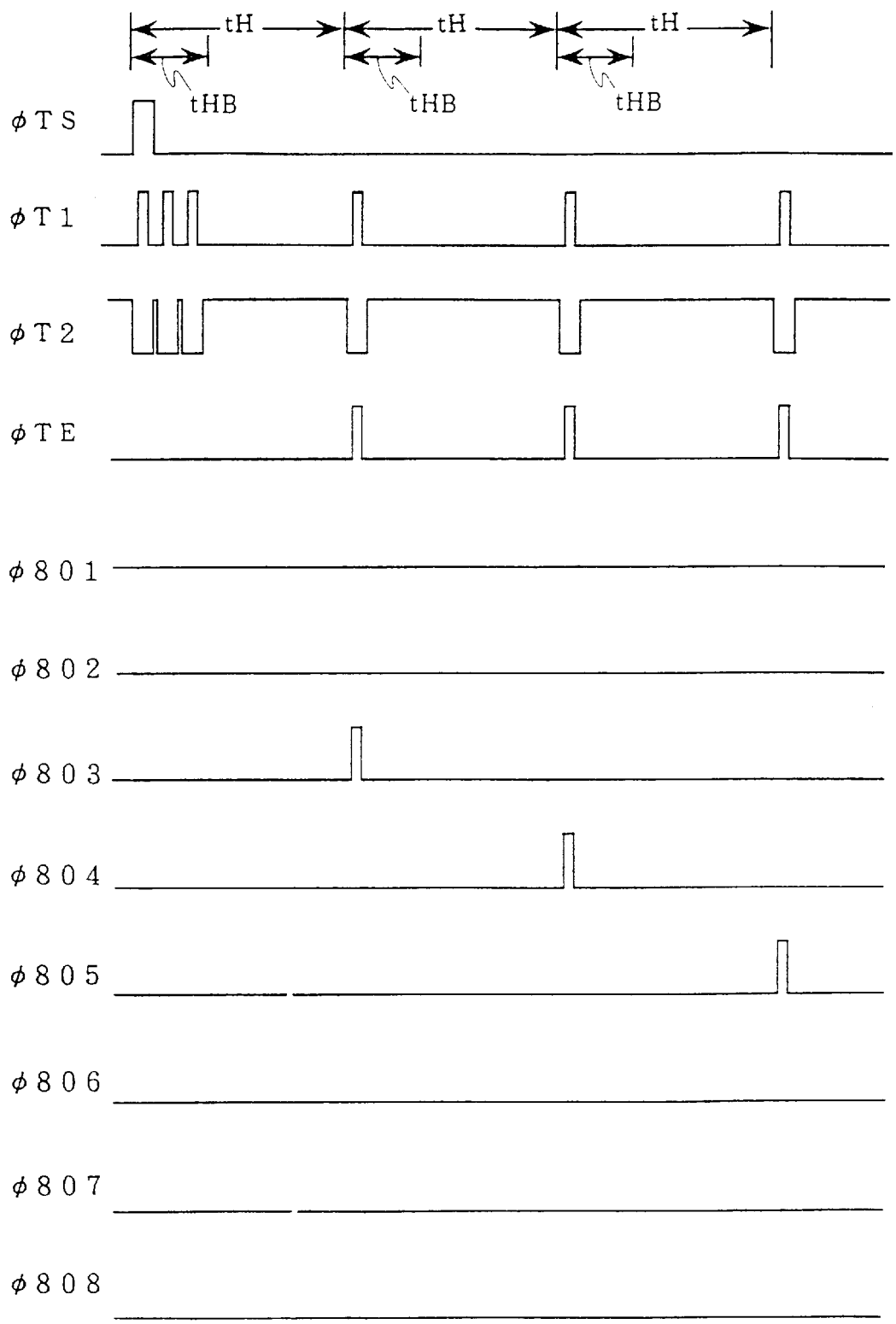
FIG. 9 is a timing chart showing the clock signal to be inputted to the focal plane array according to Embodiment 7 of the driving method of the present invention.

FIG. 9 is a timing chart showing the clock signal to be inputted to the focal plane array in Embodiment 7 of the driving method of the focal plane array according to the present invention. When FIG. 7 explained in embodiment 5 is compared with FIG. 9, it is shown that in FIG. 9 it is designed to input at a high rate the clock signals of the signals φT1 and φT2 of the period relating to the horizontal line in which no signal charge is read out of the clock signals φT1 and φT2 and the scanning rate for each stage of the shift register is made faster in the case in which the horizontal line excluding the desired horizontal line is concerned than in the case in which the desired horizontal line is concerned. The signals φT1 and φT2 of this embodiment are applicable also to the driving method to display only the desired region as shown in Embodiment 6.

By using the driving method as shown in the present embodiment, to achieve efficient scanning the scanning time relating to the region which is invalid as images can be reduced. Accordingly, in the partial display of images, even if the length of the horizontal period in reading out the signal charge of the photodetector is let to be the same as in the case in which the whole images are displayed, the time required for obtaining one picture frame is shortened, thereby making it possible to increase the frame rate (number of frames obtainable in a second).

Further, as shown in FIG. 9, by arranging to have the continued clock signals out of the signals $\phi T1$ and $\phi T2$ relating to the horizontal line in which no signal charge is read out generate in one horizontal retrace period $\phi tHB$, it changes to possible to carry out, in one horizontal retrace period, scanning of the stage of the shift register relating to the plural horizontal lines adjacent to each other among the horizontal lines excepting the desired horizontal line. As a result, the scanning time relating to the region which is ineffective as images can be minimized.

The driving method of the focal plane array in this embodiment can also be applied to the case of practicing an ordinary interlace scanning system.

EMBODIMENT 8

In the foregoing embodiments 1 to 7, there have been shown the individual interlace scanning system or the driving methods for realizing the scanning system However, in the focal plane array according to the present invention, the scanning system can be changed over only by changing the clock signal generation patterns of the signals $\phi T1$ and $\phi T2$ and control signal $\phi TE$. Accordingly, when a function capable of changing the signals $\phi T1$ and $\phi T2$ and control signal $\phi TE$ is added to the circuit for driving the focal plane array, even the camera on which only one focal plane array is mounted may be adapted to select the optimum scanning system according to the condition.

EMBODIMENT 9

In the foregoing Embodiments 1 to 8, there have been shown that the horizontal retrace period in which an output of any stage of the shift register firstly rises to the selection level is specified to be the second horizontal retrace period counted from a time when a starting clock signal is inputted into the shift register. However, the horizontal retrace period in which an output of any stage of the shift register firstly rises to the selection level is not limited to the second horizontal retrace period counted from a time when a starting clock signal is inputted into the shift register.

For exmaple, an output of any stage of the shift register can be raised to a selection level in a horizontal retrace period of a horizontal period when a starting clock signal is inputted into the shift register, i.e., a first horizontal retrace period. So as to raise an output of any stage of the shift register to be a selection level in the first horizontal retrace period, signals $\phi T1$, $\phi T2$ and control signal $\phi TE$ are modified so that the signals $\phi T1$, $\phi T2$ and control signal $\phi TE$ change to H-level simultaneously. Further, according to this embodiment, after the second horizontal retrace period, shift registers are operated in such a manner that the shift register is operated under a condition that the third and the successive horizontal retrace periods which are described in Embodiments 1 to 7 are advanced respectively by one horizontal retrace period. For instance, the third horizontal retrace period in each preceding Embodiment corresponds to the second horizontal retrace period; and the fourth horizontal retrace period corresponds to the third horizontal retrace period in this embodiment.

The focal plane array according to the present invention comprises two-dimensionally arranged photodetectors, a charge transfer device for reading out the signal charges stored in the photodetectors, a transfer gate connected between the photodetectors and the charge transfer device, and a pixel row selection circuit connected to the transfer gate. The focal plane array is to be operated so that, in one horizontal retrace period, the signal charge is read out to the vertical charge transfer device from the photodetector included in at least one horizontal line, and in the horizontal retrace period including the horizontal retrace period, the signal charge in the vertical charge transfer device is transferred outside the photodetector array region in which the photodetectors are two-dimensionally arranged. The pixel row selection circuit comprises a shift register and a switching transistor connected between the shift register and the transfer gate. The photodetector is selected so that, by the combination of the drives of the shift register and the switching transistor, the horizontal line is selected and the signal charge is read out. Accordingly, an effect that it is possible to obtain easily a focal plane array which can be operated so as to be able to meet an ordinary television sets interlace scanning system is obtained.

The focal plane array according to the present invention is such that the switching transistor is either one of the MOS transistor and the bipolar transistor. Accordingly, an effect that it is possible to control easily the ON/OFF state of the switching transistor is obtained.

The focal plane array according to the present invention is such that the switching transistor is a MOS transistor. Therefore, an effect that the device can be produced in the same process as that of other constitution elements of focal plane array is obtained.

The first driving method of the focal plane array according to the present invention is such that, in the driving method of the focal plane array according to the present invention, one frame is composed of two fields, and in the first field, the shift register is driven so that the output of the first stage of the shift register rises to a selection level in the second horizontal retrace period from the time of the input of the starting clock signal in the shift register, and in each horizontal retrace period after the second horizontal retrace period, the output of each remaining stage of the shift register rises to sequentially a selection level by the consecutive two stage portions in one horizontal retrace period, and in the second field, the shift register is driven so that the output of each stage of the shift register rises to sequentially a selection level by the consecutive two stage portions on one horizontal retrace period in the horizontal retrace period coming on and after the second time when the starting clock signal is inputted to the shift register, and further, when the output of at least one stage of the shift register rises to the selection level, a control signal is given to the switching transistor so as to make the switching transistor ON state. Accordingly, an effect that the focal plane array can be easily operated to be able to meet an interlace scanning system of ordinary television is obtained.

The second driving method of the focal plane array according to the present invention is such that, in the driving method of the focal plane array according to the present invention, one frame is constituted by two fields, and in the first field, the shift register is driven so that the output of the first stage of the shift register rises to a selection level in the second horizontal retrace period from the time of the input of the starting clock signal in the shift register, and in each horizontal retrace period after the second horizontal retrace period, the output of each remaining stage of the shift register rises to a selection level sequentially by the consecutive two stage portions on one horizontal retrace period, and when the output of at least the N-th stage of the shift register rises to a selection level, control signal is given to the switching transistor so as to make the switching transistor ON state, and in the second field, the shift register is driven so that the output of each stage of the shift register rises to sequentially a selection level by the consecutive two stage portions on one horizontal retrace period in the horizontal retrace period coming on and after the second time when the starting clock signal is inputted to the shift register, and when the output of at least the M-th stage of the shift register rises to a selection level, control signal is given to the switching transistor so as to make the switching transistor ON state. Accordingly, an effect that the focal plane array can be easily operated to be able to meet an interlace scanning system of ordinary television is obtained.

The third driving method of the focal plane array according to the present invention is such that, in the driving method of the focal plane array according to the present invention, one frame comprises by n fields, and in the first field, the shift register is driven so that the output of the first stage of the shift register rises to a selection level in the second horizontal retrace period from the time of the input of the starting clock signal in the shift register, and in each horizontal retrace period after the second horizontal retrace period, the shift register is driven so as to make the output of the shift register rise to a selection level by n stages, so that, in the first field, driving is made so as to make the outputs of the shift register from the first stage to the i-th stage rise to a selection level in the second horizontal retrace period from the time when the- starting clock signal is inputted to the shift register, and in each horizontal retrace period after the second horizontal retrace period, the shift register is driven so as to make the output of the shift register rise to a selection level by n stages, and further, when the output of at least one stage of the shift register rises to the selection level, a control signal is given to the switching transistor so as to make the switching transistor be changed to ON state. Accordingly, an effect that one picture frame can be constituted by the optional number of fields of more than three is obtained.

The fourth driving method of the focal plane array according to the prsent invention is such that, in the driving method of the focal plane array according to the present invention, one frame comprises n fields, and in the first field, the shift register is driven so that the output of the first stage of the shift register rises to a selection level in the second horizontal retrace period counted from the time when the starting clock signal is inputted to the shift register, and in each horizontal retrace period after the second horizontal retrace period, the shift register is driven so as to make the output of each remaining stage of the shift register rise to a selection level sequentially by the consecutive n stages in one horizontal retrace period, and when the output of at least the first, the (n+1)-th, the (2n+1)-th . . . stage of the shift register rises to a selection level, control signal is given to the switching transistor so as to make the switching transistor be changed to ON state, and in the first field, the shift register is driven so that the output of the shift register from the first stage to the i-th stage rises to the selection level in the horizontal retrace period coming on the second time when the starting clock signal is inputted to the shift register, and in each horizontal retrace period following the second horizontal retrace period, the shift register is driven to make the output of the shift register rise to a selection level in the unit of n stages, and when the output of at least the first, the (n+1)-th, the (2n+1)-th . . . stage of the shift register rises to a selection level, control signal is given to the switching transistor so as to make the switching transistor ON state. Accordingly, an effect that one picture frame can be constituted by the optional number of fields of more than three is obtaied.

The fifth driving method of the focal plane array according to the present invention is such that, in the driving method of the focal plane array according to the present invention, control signal is given to the switching transistor so that, when the output of the shift register corresponding to at least the desired horizontal line rises to the selection level, the switching transistor rises to ON state. Accordingly, an effect that it is possible to scan only the portion relating to the desired region of the image is obtained.

The sixth driving method of the focal plane array according to the present invention is such that, in the driving method according to the present invention, the desired horizontal line is a plurality of consecutive horizontal lines in the vertical direction. Accordingly, an effect that it is possible to set optionally the place to be displayed within one picture frame is obtained.

The seventh driving method of the focal plane array according to the present invention is such that, in the driving method according to the present invention, the desired horizontal line is a plurality of groups of consecutive horizontal lines in the vertical direction, and the plural groups of horizontal lines are located separately to each another. Accordingly, an effect that it is possible to scan only the portion relating to the desired region of the image is obtained.

The eighth driving method of the focal plane array according to the present invention is such that, the scanning rate of each stage of the shift register is faster in the case in which the horizontal line excluding the desired horizontal line is concerned than in the case in which the desired horizontal line is concerned. Thus, an effect that it is possible to increase the frame rate is obtained.

The ninth driving method of the focal plane array according to the present invention is such that, scanning the stage of the shift registers concerning the plural horizontal lines adjacent to each other among the horizontal lines excluding the desired horizontal lines is carried out in one horizontal retrace period. Accordingly, an effect that it is possible to make the scanning time which is concerned with the ineffective region as a picture image shortest is obtained.

The tenth driving method of the focal plane array according to the present invention is such that, in the driving method of the focal plane array according to claim 1, the focal plane array is driven by changing over at least two driving methods among the driving methods described in the first to ninth driving methods. Accordingly, an effect that the optimum scanning system can be selected to meet the condition is obtained.

The eleventh driving method of the focal plane array according to the present invention is such that, in the driving method of the focal plane array according to the present invention, one frame is composed of two fields, and in the first field, the shift register is driven so that the output of the first stage of the shift register rises to a selection level in the predetermined horizontal retrace period after the time of the input of the starting clock signal in the shift register, and in each horizontal retrace period after the predetermined horizontal retrace period, the output of each remaining stage of the shift register rises to sequentially a selection level by the consecutive two stage portions in one horizontal retrace period, and in the second field, the shift register is driven so that the output of each stage of the shift register rises to sequentially a selection level by the consecutive two stage portions on one horizontal retrace period in the horizontal retrace period coming on and after the predetermined time after the starting clock signal is inputted to the shift register, and further, when the output of at least one stage of the shift register rises to the selection level, a control signal is given to the switching transistor so as to make the switching transistor ON state. Accordingly, an effect that the focal plane array can be easily operated to be able to meet an interlace scanning system of ordinary television is obtained.

The twelfth driving method of the focal plane array according to the present invention is such that, in the driving method of the focal plane array according to the present invention, one frame is constituted by two fields, and in the first field, the shift register is driven so that the output of the first stage of the shift register rises to a selection level in the predetermined horizontal retrace period after the time of the input of the starting clock signal in the shift register, and in each horizontal retrace period after the predetermined horizontal retrace period, the output of each remaining stage of the shift register rises to a selection level sequentially by the consecutive two stage portions on one horizontal retrace period, and when the output of at least the N-th stage of the shift register rises to a selection level, control signal is given to the switching transistor so as to make the switching transistor ON state, and in the second field, the shift register is driven so that the output of each stage of the shift register rises to sequentially a selection level by the consecutive two stage portions on one horizontal retrace period in the horizontal retrace period coming on and after the predetermined time when the starting clock signal is inputted to the shift register, and when the output of at least the M-th stage of the shift register rises to a selection level, control signal is given to the switching transistor so as to make the switching transistor ON state. Accordingly, an effect that the focal plane array can be easily operated to be able to meet an interlace scanning system of ordinary television is obtained.

The thirteenth driving method of the focal plane array according to the present invention is such that, in the driving method of the focal plane array according to the present invention, one frame comprises by n fields, and in the first field, the shift register is driven so that the output of the first stage of the shift register rises to a selection level in the predetermined horizontal retrace period after the time of the input of the starting clock signal in the shift register, and in each horizontal retrace period after the second horizontal retrace period, the shift register is driven so as to make the output of the shift register rise to a selection level by n stages, so that, in the first field, driving is made so as to make the outputs of the shift register from the first stage to the i-th stage rise to a selection level in the predetermined horizontal retrace period after the time when the starting clock signal is inputted to the shift register, and in each horizontal retrace period after the predetermined horizontal retrace period, the shift register is driven so as to make the output of the shift register rise to a selection level by n stages, and further, when the output of at least one stage of the shift register rises to the selection level, a control signal is given to the switching transistor so as to make the switching transistor be changed to ON state. Accordingly, an effect that one picture frame can be constituted by the optional number of fields of more than three is obtained.

The fouteenth driving method of the focal plane array according to the present invention is such that, in the driving method of the focal plane array according to the present invention, one frame comprises n fields, and in the first field, the shift register is driven so that the output of the first stage of the shift register rises to a selection level in the predetermined horizontal retrace period after the time when the starting clock signal is inputted to the shift register, and in each horizontal retrace period after the predetermined horizontal retrace period, the shift register is driven so as to make the output of each remaining stage of the shift register rise to a selection level sequentially by the consecutive n stages in one horizontal retrace period, and when the output of at least the first, the (n+1)-th, the (2n+1)-th . . . stage of the shift register rises to a selection level, control signal is given to the switching transistor so as to make the switching transistor be changed to ON state, and in the first field, the shift register is driven so that the output of the shift register from the first stage to the i-th stage rises to the selection level in the horizontal retrace period coming on the predetermined time when the starting clock signal is inputted to the shift register, and in each horizontal retrace period following the predetermined horizontal retrace period, the shift register is driven to make the output of the shift register rise to a selection level in the unit of n stages, and when the output of at least the first, the (n+1)-th, the (2n+1)-th stage of the shift register rises to a selection level, control signal is given to the switching transistor so as to make the switching transistor ON state. Accordingly, an effect that one picture frame can be constituted by the optional number of fields of more than three is obtained.

It should be understood that the apparatus and methods which have been shown and described herein are illustrative of the invention and are not intended to be limitative thereof. Clearly, those skilled in the art may conceive of variations or modifications to the invention. However, any such variations or modifications which falls within the purview of this description are intended to be included therein as well. The scope of the invention is limited only by the claims appended hereto.

What is claimed is:

1. A focal plane array comprising:
    a plurality of photodetectors arranged in a two-dimensional array;
    a plurality of vertical charge transfer devices for reading out signal charges stored in each of said photodetectors sequentially;
    a plurality of transfer gates, each connected between one of said photodetectors and one of said vertical charge transfer devices; and
    a pixel row selection circuit connected to said transfer gates;
    wherein said signal charges are read out from said photodetectors in at least one horizontal line to one of said vertical charge transfer devices during one horizontal retrace period and said signal charges stored in said vertical charge transfer devices are transferred outside of said two-dimensional array of photodetectors during one horizontal period including said horizontal retrace period; and
    wherein said pixel row selection circuit includes for each horizontal line a shift register stage and a switching transistor connected between said shift register stage and all of said transfer gates in the horizontal line; said at least one horizontal line being selected by combining driving said shift register stage and driving said switching transistor so that a photodetector from which the signal charge is to be read out is selected.

2. The focal plane array of claim 1, wherein said switching transistor is one selected from a MOS transistor and a bipolar transistor.

3. A method for driving a focal plane array, said array comprising a plurality of photodetectors arranged in a two-dimensional array, a plurality of vertical charge transfer devices for reading out signal charges stored in said photodetectors sequentially, a plurality of transfer gates, each connected between one of said photodetectors and one of said vertical charge transfer devices and a pixel row selection circuit connected to said transfer gates, wherein said pixel row selection circuit includes for each horizontal line a shift register stage and a switching transistor connected between said shift register stage and all of said transfer gates in the horizontal line, said method comprising the steps of:

reading out signal charges from said photodetectors in at least one horizontal line to one of said vertical charge transfer devices in one horizontal retrace period;

transferring said signal charges which are stored in said vertical charge transfer devices outside said array of photodetectors in one horizontal period including said one horizontal retrace period;

selecting said at least one horizontal line by a combination of driving said shift register stage and driving said switching transistor so that a photodetector from which a signal charge is to be read out is selected;

driving shift register stages in a first field so that an output of a first stage of said shift register stages rises to a selection level in a predetermined horizontal retrace period after a time when a starting clock signal is input into said shift register stages and so that outputs of remaining stages of said shift register stages rise to selection levels sequentially by two consecutive stages in said one horizontal retrace period after said predetermined horizontal retrace period; and driving said shift register stages in a second field so that an output of each stage of said shift register stages rises to a selection level sequentially by two consecutive stages in said one horizontal retrace period after said predetermined horizontal retrace period and providing a control signal to said switching transistor so that said switching transistor changes to ON state when an output of at least one stage of said shift register stages rises to selection level; and wherein said first field and said second field form one frame.

4. A method for driving a focal plane array, said array comprising a plurality of photodetectors arranged in a two-dimensional array, a plurality of vertical charge transfer devices for reading out signal charges stored in said photodetectors sequentially, a plurality of transfer gates, each connected between one of said photodetectors and one of said vertical charge transfer devices and a pixel row selection circuit connected to said transfer gates, wherein said pixel row selection circuit includes for each horizontal line a shift register stage and a switching transistor connected between said shift register stage and all of said transfer gates in the horizontal line, said method comprising the steps of:

reading out signal charges from said photodetectors in at least one horizontal line to one of said vertical charge transfer devices in one horizontal retrace period;

transferring said signal charges which are stored in said vertical charge transfer devices outside said array of photodetectors in one horizontal period including said one horizontal retrace period;

selecting said at least one horizontal line by a combination of driving said shift register stage and driving said switching transistor so that a photodetector from which a signal charge is to be read out is selected;

providing a control signal so that said switching transistor changes to an ON state at least when an output of said shift register stage corresponding to a desired horizontal line rises to a selection level.

5. The driving method of claim 4, wherein said focal plane array includes a plurality of desired horizontal lines, each of which is vertically consecutive.

6. The driving method of claim 4, wherein said focal plane array includes a plurality of desired horizontal lines and wherein said desired horizontal lines are sets of plural horizontal lines comprising vertically consecutive plural horizontal lines and said sets are located separately to each other.

7. The driving method of claim 4, wherein as for a speed of scanning said each stage of said shift register, a speed for scanning horizontal lines except for said desired horizontal line is faster than one for scanning said desired horizontal line.

8. The driving method of claim 4, wherein scanning for a stage of a shift register concerning plural horizontal lines adjacent to each other is performed in one horizontal retrace period.

* * * * *